(12) United States Patent
Henzler et al.

(10) Patent No.: US 12,305,651 B2
(45) Date of Patent: May 20, 2025

(54) PROCESS AND APPARATUS FOR OPERATING A COMPRESSION SYSTEM

(71) Applicant: Air Products and Chemicals, Inc., Allentown, PA (US)

(72) Inventors: Gregory W. Henzler, Emmaus, PA (US); Nicolas John Haryett, Surrey (GB); Ghassan Altimany, North Wales, PA (US); Patrick J. Smith, Schnecksville, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 339 days.

(21) Appl. No.: 17/346,789

(22) Filed: Jun. 14, 2021

(65) Prior Publication Data

US 2022/0397117 A1     Dec. 15, 2022

(51) Int. Cl.
*F04D 17/12*     (2006.01)
*F04D 25/16*     (2006.01)
(Continued)

(52) U.S. Cl.
CPC ............. *F04D 17/12* (2013.01); *F04D 25/16* (2013.01); *F04D 27/005* (2013.01); *F04D 27/0269* (2013.01); *F04D 29/5833* (2013.01)

(58) Field of Classification Search
CPC .......... F04D 17/06; F04D 17/08; F04D 17/10; F04D 17/12; F04D 25/16; F04D 27/005;
(Continued)

(56) References Cited

U.S. PATENT DOCUMENTS 4,077,748 A * 3/1978 Potz .......................... F02C 9/18
                                                          417/374
5,743,715 A    4/1998 Staroselsky et al.
(Continued)

FOREIGN PATENT DOCUMENTS

CN        108599245 A     9/2018
CN        211040479 U     7/2020
(Continued)

OTHER PUBLICATIONS

Andrzej Witkowski, Andrzej Rusin, Miroslaw Majkut, Katarzyna Stolecka "Comprehensive analysis of hydrogen compression and pipeline transportation" 2017; Elsevier, pp. 2508-2518 (Year: 2017).*
(Continued)

*Primary Examiner* — Dominick L Plakkoottam
*Assistant Examiner* — Charles W Nichols
(74) *Attorney, Agent, or Firm* — Matthew Richard Weaver

(57) ABSTRACT

Operation of a multistage compression system comprising at least one centrifugal compressor having a dry gas seal with opposed seal faces, for compressing a gas feed having a variable flow rate is improved by operating the or at least one centrifugal compressor in a low power mode where the opposed faces of the dry gas seal are not in contact during periods when gas flow through the centrifugal compressor(s) is not sufficient for normal operation. Such operation not only reduces damage to the dry gas seals and hence improves reliability, but also reduces the overall power requirement of the overall compression system.

19 Claims, 5 Drawing Sheets

(51) Int. Cl.
*F04D 27/00* (2006.01)
*F04D 27/02* (2006.01)
*F04D 29/58* (2006.01)

(58) Field of Classification Search
CPC ............ F04D 27/0269; F04D 27/0292; F04D 29/5833
See application file for complete search history.

(56) References Cited

U.S. PATENT DOCUMENTS

| | | | |
|---|---|---|---|
| 7,444,189 | B1 | 10/2008 | Marhoefer |
| 2003/0175564 | A1 | 9/2003 | Mitlitsky et al. |
| 2004/0013923 | A1* | 1/2004 | Molter ................ H01M 8/0656 |
| | | | 429/444 |
| 2004/0255615 | A1 | 12/2004 | Hupkes et al. |
| 2008/0005964 | A1 | 1/2008 | Hajiaghajani et al. |
| 2012/0100062 | A1* | 4/2012 | Nakamura .............. C01B 3/063 |
| | | | 252/375 |
| 2013/0177393 | A1 | 7/2013 | Sishtla |
| 2014/0079593 | A1 | 3/2014 | Naito et al. |
| 2017/0122125 | A1* | 5/2017 | Colley ................... F01D 11/04 |
| 2017/0122129 | A1 | 5/2017 | Heid et al. |
| 2017/0145915 | A1 | 5/2017 | Heid et al. |
| 2017/0317502 | A1 | 11/2017 | Ito |
| 2019/0277448 | A1* | 9/2019 | Krogsgaard .............. F17C 5/06 |

FOREIGN PATENT DOCUMENTS

| | | |
|---|---|---|
| CN | 112086960 A | 12/2020 |
| JP | 2018207728 A | 12/2018 |
| RU | 2753754 C1 | 8/2021 |
| WO | 2016170700 A1 | 10/2016 |

OTHER PUBLICATIONS

"K-GreeN-Digital-Solutions", Kellogg, Brown & Root LLC; Jan. 2021, 17 pgs.

Witkowski, Andrzej et al; Comprehensive analysis of hydrogen compression and pipeline transportation from thermodynamics and safety aspects, Energy, Elsevier, Amsterdam, NL vol. 141, May 26, 2017, pp. 2508-2518.

* cited by examiner

PROCESS AND APPARATUS FOR OPERATING A COMPRESSION SYSTEM

TECHNICAL FIELD

The present invention relates to a multistage compression system comprising at least one centrifugal compressor for compressing gas feed having a wide range of gas flow.

The invention relates specifically a process for operating such a system and to the apparatus involved with a view to improving reliability and reducing the overall power requirements.

BACKGROUND

Centrifugal compressors are a type of dynamic compressor, in which gas is compressed by mechanical action of rotating vanes or impellers which impart velocity to the gas. Gas typically enters at the center of the impellers and is propelled out to the radial edges under rotary motion to deliver gases at high velocity which impact the casing. The velocity of the gas is converted to a static pressure to deliver high pressure gases. These types of compressors are particularly suited to handling large volumes of gases at lower costs.

To properly compress process gases in a centrifugal compressor, dry gas seals (or "DGS") are typically used to minimize any gas leakage. These dry gas seals contain two opposed seal faces or rings which are separated during normal operation of the centrifugal compressor to compress gas.

Typically, gas for compression is produced entirely using electricity generated from a conventional energy source such as onsite petrol-, diesel- or hydrogen-powered generator(s), fuel cells, or taken from a local or national grid. In such instances, the centrifugal compressors are run at maximum capacity in order to produce the highest possible yield of net compressed product gas. The motors which drive the impellers of said centrifugal compressors are thus typically operated at a fixed speed (e.g. maximum).

The centrifugal compressors may have dry gas seals which prevent or reduce the leakage of gas. The opposed seal faces of the dry gas seals are quickly separated and maintained apart as the motor speed of the compressor is maintained at a high level. The centrifugal compressors are typically run at full power and seldom turned off in order to maximize the output of net compressed gas.

The present invention serves to address issues arising from operating centrifugal compressor(s) that receive gas at a variable flow rate, e.g. gas produced using electricity generated at least in part by one or more renewable energy sources.

DETAILED DESCRIPTION OF THE INVENTION

According to a first aspect of the present invention, there is provided a process for operating a multistage compression system for compressing gas being fed to the compression system at a variable flow rate, said multistage compression system comprising at least one centrifugal compressor incorporating a dry gas seal with opposed seal faces, said process comprising:

(a) during periods when gas flow through the centrifugal compressor(s) is sufficient for normal operation of said multistage compression system, operating said centrifugal compressor(s) in a normal power mode; and (b) during periods when gas flow through the centrifugal compressor(s) is not sufficient for normal operation of said multistage compression system, operating the centrifugal compressor or, if more than one, at least one centrifugal compressor in a low power mode at least sufficient to prevent contact of said opposed seal faces of said dry gas seal in said centrifugal compressor(s).

The invention has particular application to processes in which the variable flow of gas being fed to the multistage compression system is due to the gas being produced using electricity generated at least in part from at least one renewable energy source. Such a gas may be hydrogen produced by electrolysis of water.

In the following discussion of embodiments of the present invention, the pressures given are absolute pressures unless otherwise stated.

As mentioned above, the gas for compression may be produced using electricity generated at least in part from at least one renewable energy source. A drawback of the use of renewable energy to produce gas for compression in the centrifugal compressor(s) is the inherent variation in the availability of the energy source, which may span from full power to no power over the course of a single day. Although other energy sources (e.g. battery power, or non-renewable energy sources) may be used to supplement the power when availability is low, it is likely that there may still not be enough to produce the maximum flow of gas for compression required to fully operate the at least one centrifugal compressor.

The flow of gas for compression may vary widely from maximum flow to a very low flow, or none at all, across a single day, for example.

The centrifugal compressor(s) can tolerate some variation in the flow of gas for compression but not to the extent that would be required without turning them off periodically. When the at least one centrifugal compressor is turned off or shut down, the rotor, or impeller, speed reduces until the opposed seal faces of the DGS are no longer separated and come into contact with each other.

Thus, turning the centrifugal compressor(s) off and on frequently will accelerate wear of the DGS. This decreases the lifetime of the centrifugal compressor(s), thus requiring replacement or repair more often which can increase costs. Wear of the DGS also occurs upon restarting or powering on the centrifugal compressors.

The above issues do not apply to centrifugal compressors that compress gas produced entirely using energy from non-renewable electrical power grids since these compressors are seldom turned off due to having a substantially constant maximum flow of gas for compression.

The present inventors have therefore identified that there is a desire in the art to provide a way of operating centrifugal compressor(s) that compress gas being fed at a wide range of flow rate, e.g. gas produced using electricity generated at least in part by renewable energy source(s), such that compressor lifetime is not reduced. In addition or alternatively, it is also desired that, in the context of renewable energy, the operation of the centrifugal compressor(s) is such that as much power is preserved as possible.

The present inventors are not aware of any prior art which addresses the above issues in the context of a centrifugal compressor compressing gas produced using electricity generated at least in part by one or more renewable energy source(s).

In the context of the present invention, the at least one centrifugal compressor has incorporated within it at least one dry gas seal with opposed seal faces. Any dry gas seal(s)

suitable for centrifugal compressors may be used and these are known in the art, including but not limited to single seals, tandem seals and double opposed seals.

As mentioned above, to properly compress process gases in a centrifugal compressor, DGS may be used to minimize any gas leakage. These dry gas seals contain two opposed seal faces or rings, one is typically a rotating surface (sometimes called a "rotor") and the other is a stationary surface (sometimes called a "stator").

The rotating surface has a lifting geometry designed into it such that when it reaches a certain speed it lifts off the stationary surface creating a minute gap whereby the surfaces are non-contacting, that serves to minimize the gas leakage.

Centrifugal compressors powered by a standard non-renewable electrical power grid will be operated at a fixed speed (typically maximum speed to provide maximum amount of product gas). In these instances, the opposed seal faces of the dry gas seals are quickly separated and maintained as the motor speed of the compressor is maintained during compression of the gas. The centrifugal compressors are seldom shut down, turned off or restarted due to a constant availability of electricity from the electrical power grid.

When a centrifugal compressor with a dry gas seal is turned off, the motor speed reduces to zero and the opposed seal faces then come into contact. The more often this happens the more the opposed seal faces of the dry gas seals are worn down over time. This reduces the lifetime of the dry gas seals, which then means that compressors need to be repaired more often, increasing overall costs. More repairs of the compressors in the system also results in interruptions of the overall process to carry out said repairs, thus further complicating operation of the process and increasing costs.

DGS are often used when compressing high pressure, low molecular weight, flammable, toxic and/or expensive gases. As the DGS ages, there is typically more leakage across the seal leading to more losses which will have also an economic impact.

In the context of the present invention the centrifugal compressor(s) typically compress gas produced using electricity generated at least in part from at least one renewable energy source.

Suitable renewable energy sources include wind energy, solar energy, tidal energy and hydroelectric energy, or combinations of these sources, particularly wind energy and solar energy. Preferably, the gas for compression is produced by a process that is self-contained in terms of power generation. Ideally, the centrifugal compressor(s) are also powered by electricity generated at least in part by at least one renewable energy source, or entirely powered by renewable energy. Thus, preferably the entire electricity demand for producing the gas for compression, and optionally the compressor(s) in the multistage compression system, is ideally met using renewable energy sources.

In some alternative embodiments the electricity generated from one or more renewable energy sources may be supplemented by other sources either during periods of particularly high demand, for example for product(s) from any downstream process(es) and/or during periods when the renewable power source is only available below the threshold required to meet demand, or is not available at all. However, these additional sources of energy may also be limited and so even when electricity is supplemented from these sources there may still be insufficient electricity for normal operation of the multistage compression system.

As mentioned above, a drawback of using renewable energy is the variation in availability of the electricity generated from said renewable energy source(s). When gas is produced at least in part using renewable energy, the centrifugal compressor(s) may be need to be turned off or shutdown and restarted far more often than usual when the availability of electricity is low, which as explained above reduces the lifetime of the dry gas seal(s), and increases repairs and costs. Moreover, frequent start-up and shut-downs of the centrifugal compressors would increase operational risks.

A centrifugal compressor is exposed to risk of damage each time it is started up or shut down. Indeed, there is a higher chance of having compressor issues during start-up than shut-down. In this regard, there are typically critical speeds that should be avoided. In addition, if compressors are shut down for an extended period of time, they can be more susceptible to pitting corrosion and other types of corrosion which can lead to stress corrosion cracking and eventually failure of an impellor/compressor.

The present inventors have thus devised a process as described herein for operating a multistage compression system that reduces the number of shutdowns of the centrifugal compressor(s), and thus increases the lifetime of the dry gas seal(s). This improves the reliability of the centrifugal compressor(s).

Moreover, the inventors have devised a process by which electricity can be conserved, for example so that it can be used in other parts of the process such as for producing feed gas and/or as part of a downstream process for consuming compressed gas.

The multistage compression system is for compressing gas, preferably in preparation for consumption in at least one downstream process.

The gas for compression is typically produced using electricity generated at least in part by at least one renewable energy source, and may be any suitable gas. However, the process has particular application where the gas for compression is hydrogen gas, e.g. hydrogen gas produced by the electrolysis of water. This may be carried out by a plurality of electrolysers.

In some embodiments the process comprises producing hydrogen gas by electrolysis of water. Additionally or alternatively, the process may comprise feeding compressed hydrogen gas to at least one downstream process for consumption in said downstream process(es).

Thus, in some preferred embodiments the process comprises:
producing hydrogen gas by electrolysis of water;
compressing said hydrogen gas in the multistage compression system operated according to the present invention to produce compressed hydrogen gas; and
feeding said compressed hydrogen gas to at least one downstream process for consumption in said downstream process(es).

Preferably at least some of the compressed hydrogen gas is used to produce ammonia and/or methanol in the downstream process(es), most preferably to produce ammonia.

As mentioned above, centrifugal compression is particularly suited to compressing large volumes of hydrogen gas at a lower cost, and thus the compression of hydrogen gas is particularly preferred and advantageous to the process of the invention. Moreover, hydrogen gas produced by electrolysis is even further suited to centrifugal compression due to being "wet" and having a higher density, making centrifugal compression of said gas more efficient than compressing hydrogen gas which has not been produced by electrolysis.

Renewable Energy Sources

The process of the present invention comprises compressing a gas feed having a variable flow, such as gas produced using electricity generated at least in part from at least one renewable energy source.

Operation of the compression system will normally be dictated by gas produced using electricity from a renewable energy source (e.g. hydrogen gas from the electrolysers). Typically, the power required to produce gas for compression (e.g. using electrolysers) is much greater than the power needed to run the compressor(s). When low or no gas is being supplied, it will typically be injected from storage (see below).

It is preferred that, in order to reduce environmental impact, that the process will be self-contained in terms of power generation for producing gas, and optionally, powering the centrifugal compressor(s). Thus, preferably the entire electricity demand for producing the gas for compression, and optionally for the centrifugal compressor(s), is met using renewable power sources, without supplementing said sources using non-renewable energy.

It will be appreciated that where the available electricity generated from the renewable energy source(s) is not sufficient for normal operation of the multistage compression system, putting the or at least one centrifugal compressor in low power mode puts the amount of net compressed gas being produced by said system at risk of being reduced. In such instances, it is preferred that the demand for compressed gas is met by feeding gas from a suitable storage system, before consideration of using any non-renewable energy sources to produce further gas (or to power the centrifugal compressors) is made.

Nonetheless, there may be instances where the demand for compressed gas cannot be met by either the gas being fed for compression (e.g. hydrogen from electrolysers) or the gas storage system. Thus, it will be envisaged that in some embodiments electricity generated from one or more renewable energy sources may be supplemented by other sources either during periods of particularly high demand of, for example, product(s) from the downstream process(es) and/or during periods when the renewable power source is only available below the threshold required to meet said demands of the process, or is not available at all, and the provision of gas from a gas storage system is not sufficient to meet said demands.

Thus, in some embodiments at least some additional electricity may be taken from onsite battery storage and/or generated from one or more onsite petrol-, diesel- or hydrogen-powered generator(s), including fuel cells and/or taken from a local or national grid.

Nevertheless, there may be instances where the electricity generated by the renewable energy source(s) and said additional electricity is still not sufficient for normal operation of the multistage compression system.

In these embodiments, the gas for compression is produced using, and centrifugal compressor(s) optionally powered by (i) electricity generated at least in part from at least one renewable energy source, and (ii) electricity from onsite battery storage and/or generated from one or more onsite petrol-, diesel- or hydrogen-powered generator(s), and characterized in that (a) during periods when the (i) electricity generated from the renewable energy source(s) and (ii) electricity from battery storage and/or generated from one or more onsite petrol-, diesel- or hydrogen-powered generator(s), and hence gas flow through the centrifugal compressor(s), is sufficient for normal operation of said multistage compression system, operating said centrifugal compressor(s) in a normal power mode; and (b) during periods when the (i) electricity generated from the renewal energy source(s) and (ii) electricity from battery storage and/or generated from one or more onside petrol-, diesel- or hydrogen-powered generator(s), and hence gas flow through the centrifugal compressor(s), is not sufficient for normal operation of said multistage compression system, operating the centrifugal compressor or, if more than one, at least one centrifugal compressor in a low power mode at least sufficient to prevent contact of said opposed seal faces of said dry gas seal in said centrifugal compressor(s).

Normal Power Mode

The centrifugal compressor(s) of the present invention will operate in a normal power mode during periods when the gas flow through the centrifugal compressor(s) is sufficient for normal operation of said multistage compression system.

In the context of the present invention, the term "normal power mode" is used herein to refer to the following methods of operating the centrifugal compressors described below, typically wherein there is net compressed hydrogen gas being produced. The expression "net compressed hydrogen gas" means the total amount of compressed gas being produced minus the total amount of gas that is recycled.

The normal power mode comprises at least three different modes of operation.

First, the at least one centrifugal compressor is considered to be in a normal power mode where it is being operated at full (herein after called "maximum" operation) power to provide as much net compressed gas as possible. In this situation, the at least one centrifugal compressor is operating at a power which is substantially 100% of total power with substantially maximum total flow of net compressed gas at the product end, i.e. there is no recycling of gas.

Second, the at least one centrifugal compressor is considered to be in a normal power mode where it is being operated at a slightly reduced capacity (hereinafter called "turndown" operation), wherein the power is less than 100% but at the same time about 60% or more, preferably about 70% or more, e.g. from 70% to 80%, relative to maximum power (100%). This reduction in compressor power leads to a reduction in rotor speed and thus there is an associated reduced flow of net compressed gas at the product end of the compressor. For a reduction in gas flow (at constant discharge pressure) to the multistage compression system, this will typically require a proportional reduction in compressor power. When a centrifugal compressor is in "maximum" turndown it is turned down, with an associated reduced flow, as far as possible without reaching compressor surge or activating any anti-surge controls.

Third, the at least one centrifugal compressor is considered to be in a normal power mode where it is being operated in maximum turndown mode, but where at least part of the compressed gas at the product end is recycled from the product end to the feed end of the centrifugal compressor (hereinafter called "recycle" operation).

In other words, in this recycle operation the power is reduced as much as possible using the turndown operation with the associated flow of compressed gas at the product end reduced proportionally to the gas flow entering the multistage compression system. However, where the flow of net compressed gas needs to be reduced even further due to a drop in gas flow entering the multistage compression system, this can be done by incorporating an increasing amount of recycled gas from the product end to the feed end of the centrifugal compressor(s). This reduces the overall flow of net compressed gas without any further reduction in power supplied to the centrifugal compressor(s). Accordingly, it is preferred that the amount of time spent with the centrifugal compressor(s) in a recycle operation is minimized, since although possible, it does not result in a reduction in power usage. It is preferred that the centrifugal compressor(s), if not able to be at maximum operation, are put into turndown operation in said normal power mode. It will be appreciated that the recycle operation is only used once the centrifugal compressor power has been reduced as far as possible in turndown.

Thus, the normal power mode may comprise a maximum, turndown, or recycle operation as described herein, but it is preferred that the normal power mode comprises a maximum and turndown operation.

In the context of the present invention, the expression "sufficient for normal operation" is intended to mean that there is enough gas flow through the centrifugal compressor(s) producing net compressed gas that allows the centrifugal compressors to be run at or above maximum turndown. Therefore, "sufficient for normal operation" typically means there is enough electricity to provide a gas flow to operate the centrifugal compressor(s) in a normal power mode comprising a maximum, turndown or recycle operation as described herein.

Optionally, if the centrifugal compressor(s) are also powered by renewable energy, this expression is intended to mean that the electricity generated is also sufficient to power the centrifugal compressor(s) at or above the power required for maximum turndown.

However, as mentioned above typically the power required to produce the gas for compression may be much higher than the power required to operate the centrifugal compressor(s). Therefore, where hydrogen gas for compression is produced by electrolysis using renewable energy, for example, then the limiting factor for whether there is sufficient electricity generated for normal operation is the flow of gas being produced by said electrolysers.

As mentioned above, in some embodiments the electricity generated from one or more renewable energy sources may be supplemented by other sources either during periods of particularly high demand, for example for product(s) from any downstream process(es) and/or during periods when the renewable power source is only available below the threshold required to meet demand, or is not available at all. In these cases, additional electricity may be taken from onsite battery storage and/or generated from one or more onsite petrol-, diesel- or hydrogen-powered generator(s), including fuel cells and/or taken from a local or national grid. In these embodiments, the gas for compression in said centrifugal compressor(s) is produced using (i) electricity generated at least in part from at least one renewable energy source, and (ii) electricity from onsite battery storage and/or generated from one or more onsite petrol-, diesel- or hydrogen-powered generator(s).

Thus, in these embodiments the process comprises (b) during periods when the (i) electricity generated from the renewable energy source(s) and (ii) electricity from battery storage and/or generated from one or more onside petrol-, diesel- or hydrogen-powered generator(s), and hence gas flow through the centrifugal compressor(s), is sufficient for normal operation of said multistage compression system, operating said centrifugal compressor(s) in a normal power mode During operation in said normal power mode, the centrifugal compressor(s) have dry gas seals with the opposed seal faces not in contact (i.e. separated) due to the motor speed of the compressor providing sufficient lifting force.

Low Power Mode

Based on the current state of the art, the centrifugal compressor(s) would typically be shut down or turned off in response to a significant reduction in gas flow to the compression system, with a view to being restarted once gas flow increases sufficiently. However, the present inventors have devised a process by which the centrifugal compressors instead are operated in a "low power" mode (LP mode).

Thus, during periods when the gas flow through the centrifugal compressor(s) is not sufficient for normal operation of said multistage compression system, the present invention comprises operating the centrifugal compressor or, if more than one, at least one centrifugal compressor in a low power mode at least sufficient to prevent contact of said opposed seal faces of said dry gas seal in said centrifugal compressor(s).

As mentioned above in some embodiments electricity generated from one or more renewable energy sources may be supplemented by other sources either during periods of particularly high demand of, for example, product(s) from the downstream process(es) and/or during periods when the renewable power source is only available below the threshold required to meet said demands of the process, or is not available at all. In these embodiments, the gas for compression in said centrifugal compressor(s) is produced using (i) electricity generated at least in part from at least one renewable energy source, and (ii) electricity from onsite battery storage and/or generated from one or more onsite petrol-, diesel- or hydrogen-powered generator(s).

In these embodiments the process comprises (b) during periods when the (i) electricity generated from the renewal energy source(s) and (ii) electricity from battery storage and/or generated from one or more onside petrol-, diesel- or hydrogen-powered generator(s), and hence gas flow through the centrifugal compressor(s), is not sufficient for normal operation of said multistage compression system, operating the centrifugal compressor or, if more than one, at least one centrifugal compressor in a low power mode at least sufficient to prevent contact of said opposed seal faces of said dry gas seal in said centrifugal compressor(s).

Thus, in other words a lack of electricity from renewable energy sources (and lack of gas flow from storage) may result in the gas for compression being provided with a significantly reduced flow, such that the centrifugal compressor(s) cannot be operated in a normal power mode.

Thus, in response to a lack of electricity, the rotor speed of the centrifugal compressor, or if more than one, at least one centrifugal compressor, is reduced but not completely zero (i.e. the compressor is not turned off or shutdown).

In said low power mode, the or at least one centrifugal compressor is operating with a low amount of power that is sufficient to prevent contact of said opposed seal faces of said dry gas seal in said centrifugal compressor(s) and is preferably producing no net compressed gas.

The opposed seal faces (sometimes called "rings" in the art) are separated and not in contact during said low power mode. That is, the motor speed of the or at least one centrifugal compressor is reduced compared with the normal power mode, yet it is high enough to exceed the so-called "lift-off" speed of the DGS so that these opposed seal faces are kept apart from one another.

The opposed seal faces typically have a rotating surface and a stationary surface. The rotating surface has a lifting geometry designed into it such that when it reaches a certain speed it is lifted off a stationary surface. This creates a minute gap with non-contacting surfaces which results in minimal gas leakage. Thus, in the context of the present invention "prevent contact" is intended to mean that said minute gap with non-contacting surfaces is present.

It will be appreciated that since there is a rotor speed that is non-zero during said low power mode, the centrifugal compressor(s) will be operating in such a way that compressed gas still is being produced. However, this gas will be recycled, preferably entirely recycled, from the product end to the feed end of the compressor. In other words, during said low power mode, no net compressed gas is being produced since only recycled gas is being compressed.

The amount of power to the compressor required to prevent contact between said opposed seal faces depends on the design of not only the centrifugal compressor(s) but also the dry gas seals. Typically, however, a centrifugal compressor in low power mode will be operated above this minimum power threshold to ensure that contact is prevented. In the low power mode, the power to the centrifugal compressor is typically from about 5% to about 20%, e.g. from about 8% to about 15%, e.g. about 10%, of the maximum power for the compressor. The "lift-off" speed is the rotor speed (in rpm) required before the seal faces of a DGS move out of contact and will depend at least in part on the design of the DGS and the manufacturer. In this regard, the manufacturer of a given DGS will indicate the lift-off speed of the DGS. However, it should be noted that the lift-off speed of a DGS from one manufacturer may be different that of another manufacturer, even for a DGS of similar design. In addition, the lift-off speed may also change over time as the DGS ages and/or becomes contaminated. With this in mind, the rotor speed during low power mode is typically greater than, e.g. at least double or even three times, the lift-off speed indicated by the manufacturer to ensure non-contact of the seal surfaces in the DGS. For example, if the lift-off speed for a given DGS is 300 rpm, then the rotor speed during low power mode of a compressor using that DGS may be about 600 rpm or even 900 rpm.

It is within the ability of the skilled person to determine by trial a suitable rotor speed for the DGS in a centrifugal compressor operating in low power mode. For the purposes of illustration, however, the rotor speed during low power mode will be less than during normal power mode (e.g. about 3000 rpm to about 3500 rpm) and may be in the range from about 100 rpm to about 1500 rpm, e.g. from about 200 rpm to about 1000 rpm, or from about 400 rpm to 900 rpm.

The rotor speed of (or power supplied to) a centrifugal compressor, e.g. for switching between said normal power mode and low power mode, can be manipulated using suitable means known to those skilled in the art, including but not limited to a variable frequency drive (VFD) and a mechanical drive. Other mechanical devices such as two-speed motors may be used.

It will be appreciated that a control system may also be used to monitor and control the rotor speed or amount of power of the centrifugal compressor(s).

Plurality of Centrifugal Compressors

Operation of the multistage compression system is dependent on the flow of the gas feed to the compressors, which in turn may be dependent on available power for producing gas. Ideally, there will be sufficient power generated from the renewable energy source(s) to provide a flow of gas for compression that allows all of the compressors to be run at full power. However, this ideal situation cannot not be maintained indefinitely using renewable energy sources.

As the power generated from the renewable energy sources drops, so does the flow of gas for compression to the multistage compression system (and if the compressors are powered by renewable energy, the power available for powering the compressors), and so the centrifugal compressor(s) will typically be switched into turndown to reduce power usage. As the available power continues to drop, gas flow through the compressor stages with typically be recycled and/or the compressors will be switched into LP mode in sequence as the available power reduces. The available power will cycle everyday requiring the need to go to the LP mode.

In some embodiments the multistage compression system comprises a plurality (X) of centrifugal compressors, arranged in parallel and/or in series.

In some preferred embodiments, the multistage compression system comprises a plurality (X) of centrifugal compressors arranged in parallel, and during periods when the electricity generated from the renewal energy source(s) (and optionally onsite battery storage and/or generated from one or more onsite petrol-, diesel- or hydrogen-powered generator(s)) is not sufficient for normal operation of said multistage compression system:
  a first number (Y) of the centrifugal compressors are in said normal power mode, and
  a second number (Z) of the centrifugal compressors are in said low power mode,
the first and second numbers (Y, Z) being determined based on the gas flow to the multistage compression system. In this context X, Y and Z are whole numbers where X is 2 or more; Y and Z can be from 0 to X, and X=Y+Z.

It will be appreciated that a control system is typically used to determine and control the number of centrifugal compressors in said low power mode or normal power mode.

This allows for none, some, or all of the plurality of centrifugal compressors to be put into said low power mode, as required. An advantage of this is that the multistage compression system can continue to produce net compressed gas by keeping one or more of the centrifugal compressors in said normal power mode, despite lacking the gas feed flow to operate all centrifugal compressors in said normal power mode.

Thus, this embodiment allows for the most efficient use of available electricity since putting some centrifugal compressors in low power mode "frees up" available electricity which can then be supplied to other parts of the process, such as producing gas (e.g. electrolysers for producing hydrogen gas), compressing gas (e.g. supplying electricity for operating one or more centrifugal compressors in a normal power mode), or energy for downstream process(es), for example.

By way of an example, the multistage compression system may comprise four centrifugal compressors arranged in parallel, and:
  (i) during periods where there is 80 to 100% of the maximum gas flow to the compression system, all four centrifugal compressors are in said normal power mode;
  (ii) during periods where there is 60 to 80% of the maximum flow of gas to the compression system, three centrifugal compressors are in said normal power mode and one centrifugal compressor is in said low power mode;
  (iii) during periods where there is 40 to 60% of the maximum flow rate of gas to the compression system, two centrifugal compressors are in said normal power mode and two centrifugal compressors are in said low power mode;

(iv) during periods where there is 20 to 40% of the maximum flow of gas to the compression system, one centrifugal compressor is in said normal power mode and three centrifugal compressors are in said low power mode; and (v) during periods where there is less than 20% of the maximum flow of gas to the compression system, all four centrifugal compressors are in said low normal power mode.

It will be readily appreciated by the skilled person that the above example could be adapted for a multistage compression system having more or fewer centrifugal compressors arranged in parallel without undue burden.

In this regard, the above example can also be represented using general formulae. Thus, in some embodiments the multistage compression system comprises a plurality (X) of centrifugal compressors arranged in parallel, and wherein during periods where the flow rate of gas to the compression system is P% of the maximum flow of gas to the compression system, the number of centrifugal compressors operating in normal power mode is Y, wherein $Y=X \times P\%$ and Y is rounded down to the nearest whole number, and the number of centrifugal compressors operating in said low power mode is Z, wherein $Z=X-Y$, and X, Y and Z are whole numbers.

X is the number of centrifugal compressors arranged in parallel and hence is non-zero. X is usually in the range from 2 to 10. Y and Z are individually in the range from 0 to 10 and the sum of Y and Z must equal X, i.e. $X=Y+Z$.

Thus, the present invention may allow for the number of centrifugal compressors in said low power mode or said normal power mode to be such that the amount of electricity available for centrifugal compression is conserved as much as possible without unduly shutting down the or at least one centrifugal compressor. This reduces wear of the dry gas seals and extends the lifetime of the centrifugal compressor(s). Alternatively or in addition, this allows for as much electricity to be conserved as possible, which "frees up" electricity for use elsewhere in the process and is particularly important in the context of renewable energy source(s).

Further Compressor

It will be appreciated that where one or more centrifugal compressors are switched to a low power mode, this may result in a lower flow of net compressed gas.

In some instances, there may not be enough electricity for normal operation of any of the centrifugal compressors in said multistage compression system, so that the gas for compression can only be supplied is at a significantly reduced flow, if at all, such that all of the centrifugal compressors may be operating in said low power mode—i.e. no net compressed gas is produced by said centrifugal compressors.

Thus, in some embodiments the multistage compression system comprises at least one further compressor, and wherein during periods when the centrifugal compressor(s) is/are in low power mode, the process comprises compressing gas in said further compressor(s).

An advantage of this embodiment is that even when all of the centrifugal compressors are in low power mode, gas continues to be compressed in the multistage compression system.

Said further compressor may be a centrifugal compressor or reciprocating compressor, preferably a reciprocating compressor. In some preferred embodiments, said further compressor is downstream of the centrifugal compressor(s) in said low power mode.

In some embodiments, this further compressor may be part of a further stage of compression downstream of said centrifugal compressor(s) in said low power mode. In particularly preferred embodiments the centrifugal compressor(s) in said low power mode are in a first section, and said further compressor is a reciprocating compressor that is part of a stage of compression within a second section downstream of said first section.

It will be envisaged that the further compressor will receive gas for compression at a suitable pressure, i.e. at about the inlet pressure to said further compressor. The term "suitable" in this context is intended to mean that the pressure of the gas is reduced to an appropriate extent having regard to the inlet pressure said further compressor to which the gas is fed.

The gas for compression in said further compressor may be fed from various sources. However, it is particularly preferred that gas is fed from a storage system as explained hereinbelow.

Return of Stored Gas

One of the drawbacks of using electricity generated from a renewable energy source (e.g. to produce gas) is the inherent fluctuations in the availability of the energy source, in turn leading to fluctuations in the flow of the gas feed to the system. In some embodiments, this problem may be addressed in the present invention by providing a system for collecting and storing at least some, preferably all, of the excess gas produced during periods when production exceeds demand from a downstream process(es), and distributing stored gas to said downstream process(es) during periods when the demand exceeds production.

In the context of the present invention, said storage system may also be for distributing stored gas to said further compressor for compressing gas where the centrifugal compressor, or if more than one, at least one centrifugal compressor is operating in said low power mode.

Thus, in yet further embodiments gas is fed to said further compressor(s) by withdrawing compressed hydrogen gas from storage and, after suitable pressure reduction, feeding said reduced pressure hydrogen gas to said further compressor(s), said further compressor(s) being downstream of said centrifugal compressor(s) in said low power mode.

In some embodiments, the compressed gas may be stored without further compression. In these embodiments, the gas is stored at a pressure up to a maximum pressure of the pressure to which the gas is compressed in the multistage compression system, e.g. a pressure up to a maximum of about the feed pressure of the downstream process (where there is only one) or about the feed of one of the downstream processes (if there are more than one). In such embodiments, the compressed gas may perhaps be stored at a pressure up to a maximum pressure in the region of about 25 bar to about 30 bar.

The compressed gas may however be further compressed prior to storage. In these embodiments, compressed gas may be stored at a pressure up to a maximum of about 200 bar, or up to a maximum of about 150 bar, or up to a maximum of about 100 bar, or up to a maximum of about 90 bar, or up to a maximum of about 80 bar, or up to a maximum of about 70 bar, or up to a maximum of about 60 bar, or up to a maximum of about 50 bar.

During periods when the level of demand for the gas exceeds the production level, compressed gas is removed from storage and reduced in pressure to produce reduced pressure gas. Pressure may be reduced in any conventional manner, particularly by passing the gas through a valve.

The pressure of the reduced pressure gas will depend on the pressure at the point in the multistage compression system to which the reduced pressure gas is to be added.

In some embodiments, reduced pressure gas may be fed to a final stage of the multistage compression system. In these embodiments, the reduced pressure gas will be at the inlet pressure of the feed to the final stage.

In other embodiments, reduced pressure gas may be fed to an intermediate stage of the multistage compression system. In these embodiments, the reduced pressure gas will be at the inlet pressure of the feed to the intermediate stage.

The intermediate stage may be an intermediate stage within a compression section or, where there are two or more sections in the multistage compression system, the initial stage within a further compression section downstream of a first compression section. In these embodiments, the reduced pressure gas from storage will be at the inlet pressure of the feed to the further compression section, i.e. the "inter-section" pressure.

In still further embodiments, the reduced pressure gas may be fed to the feed end, i.e. to the initial stage, of the multistage compression system. In these embodiments, the reduced pressure gas will be the feed pressure to the multistage compression system, e.g. about 1.1 bar.

However, in particularly preferred embodiments the reduced pressure gas may be fed to a stage downstream of said centrifugal compressor(s) operating in said low power mode. Thus the "intermediate" or "final" stage referred to herein may refer to said stage downstream of said centrifugal compressor(s) in said low power mode.

As mentioned above, this allows for at least some gas to be continually compressed in said multistage compression system during periods where the centrifugal compressor, or if more than one, at least one centrifugal compressor is operating in said low power mode. Thus, despite one or more of the centrifugal compressors being operated in said low power mode and producing no net compressed gas, the use of a further compressor and storage system allows for the flow of net compressed gas at the outlet of the multistage compression system to be maintained regardless.

In embodiments in which the compression system comprises a low pressure (LP) section of centrifugal compressors and a medium pressure (MP) section of reciprocating compressors, gas from storage may be injected upstream of the MP section, e.g. between the LP and MP sections. gas from storage may also be injected between the LP centrifugal compressor casings.

During periods when demand exceeds production, the method may comprise:
  reducing the pressure of the compressed gas withdrawn from storage to produce reduced pressure gas at the inlet pressure to a first stage of the multistage compression system (a first intermediate pressure); and
  feeding the reduced pressure gas to the first stage.

In such embodiments, once the pressure of the compressed gas in storage falls to about the inlet pressure of the first stage, the method may comprise:
  reducing further the pressure of the compressed gas withdrawn from storage to produce reduced pressure gas at an inlet pressure to a second stage of the multistage compression system upstream of the first stage (a second intermediate pressure); and
  feeding the reduced pressure gas to the second stage.

It will be understood that the terms "first stage" and "second stage" in this context do not refer to the relative positions of the stages in the multistage compression system in the downstream direction during normal operation. In contrast, the terms are merely intended to reflect the order of the stages to which reduced pressure gas is fed to the multistage compression system during periods when demand exceeds production. The terms "first intermediate pressure" and "second intermediate pressure" should be interpreted accordingly with the first intermediate pressure being higher than the second intermediate pressure.

These embodiments may further comprise feeding reduced pressure gas to other stages of the multistage compression system upstream of the first and second stages. In these further embodiments, the pressure of the compressed gas withdrawn from storage is reduced to the inlet pressure to the respective stages.

In some preferred embodiments, the second stage is the initial stage of the multistage compression system.

It will be appreciated that, in embodiments where reduced pressure gas is fed to a second stage after the first stage, gas flow to the first stage is stopped when gas flow to the second stage starts. Generally speaking, flow of reduced pressure gas to a given compression stage is stopped when flow of reduced pressure gas to another compression stage starts.

In some preferred embodiments, wherein during feeding of said reduced pressure gas to a stage, the centrifugal compressor or, if more than one, at least one centrifugal compressor upstream of said stage is operating in said low power mode.

Since gas can be returned from storage to an intermediate stage and/or the initial stage of the multistage compression system, the compressed gas may be stored at a pressure down to a minimum of about 5 bar, perhaps even down to a minimum of about 1.3 bar.

In embodiments in which compressed gas is further compressed before being stored, another option would be for compressed gas withdrawn from storage to be fed, after suitable pressure reduction, directly to a downstream process(es) until the storage pressure falls to the feed pressure of said downstream process(es). At that point, the pressure of the compressed gas withdrawn from storage would be reduced further and the reduced pressure gas fed to a stage of the multistage compression system in accordance with the present invention. However, these embodiments are not preferred, e.g. because of the additional capital expense of the high-pressure storage system.

The term "suitable" in the context of pressure reduction is intended to mean that the pressure of the gas is reduced to an appropriate extent having regard to the inlet pressure of the stage of the multistage compression system to which the reduced pressure gas is fed.

Compared to a high-pressure storage system with discharge only to the feed pressure of a downstream process, these embodiments of the present invention enable the storage volume of gas to be reduced by using the multistage compression system that is already present in the process to recompress gas from storage when the storage pressure drops below that feed pressure. The gas can thereby continue to be taken from storage until the storage pressure falls to a minimum of the feed pressure to the multistage compression system.

Additional compression power is required during periods when gas production is limited by lack of power, e.g. to the electrolysers, but the additional compression power can be minimized by supplying gas at the highest compressor inter-stage pressure possible given the storage pressure at a particular time. It also allows the maximum gas storage pressure to be at or below the feed pressure of any downstream process to eliminate any additional compression requirement for gas to storage.

It will be appreciated that the same volume of gas is stored in the same storage volume at the same maximum pressure and that reducing the minimum storage pressure increases the "releasable" volume of gas from storage, i.e. the usable volume of stored gas.

The inventors have, however, realized that where gas is produced and then compressed in a multistage compression system for use in at least one downstream process, the releasable volume of stored gas may be increased by returning gas from storage to a stage in the multistage compression system rather than directly to the downstream process, and that this arrangement reduces the overall storage vessel volume required by the process.

By way of example, storage from a maximum pressure of 200 bar to a minimum pressure of 1.5 bar requires 15% less storage vessel volume for a given mass of releasable gas compared to storage from a maximum pressure of 200 bar to a minimum pressure of 30 bar.

Similarly, storage from a maximum pressure of 100 bar to a minimum pressure of 1.5 bar requires 30% less storage vessel volume for a given mass of releasable gas compared to storage from a maximum pressure of 100 bar to a minimum pressure of 30 bar.

In addition, storage from a maximum pressure of 50 bar to a minimum pressure of 1.5 bar requires 60% less storage vessel volume for a given mass of releasable gas compared to storage from a maximum pressure of 50 bar to a minimum pressure of 30 bar.

Further, storage from a maximum pressure of 30 bar to a minimum pressure of 1.5 bar is feasible compared to 30 bar to 30 bar which would allow no storage.

Moreover, although the total storage vessel volume increases as the maximum storage pressure is reduced, the lower design pressure makes the vessel walls thinner and can reduce the overall capital cost of the storage system. The vessel thickness is often limited to a maximum value by considerations such as manufacturability, and in that case the lower design pressure will lead to fewer vessels (although each vessel will be larger). Furthermore, the allowable stress for the design of a vessel may be increased below a particular vessel wall thickness, and if the lower design pressure allows the thickness to be below this threshold, the total vessel metal mass (and therefore the total cost) can be reduced.

Gas for Compression

The gas for compression in the multistage compression system may be any gas suitable for compression in centrifugal compressors that has a variable flow rate. The gas is preferably produced using electricity generated at least in part from at least one renewable energy source. However, it is particularly preferred that the gas for compression is hydrogen gas, preferably produced by electrolysis of water.

Any suitable form of water electrolysis may be used including alkaline water electrolysis and polymer electrolyte membrane (PEM) water electrolysis.

The water used for the electrolysis is typically sea water that has been desalinated, possibly by reverse osmosis, and demineralized.

The electricity required for electrolysis may be generated at least in part from any suitable renewable energy source. In some preferred embodiments however, at least some of the electricity required for the electrolysis is generated from a renewable energy source including wind energy, solar energy, tidal energy and hydroelectric energy, or combinations of these sources, particularly wind energy and solar energy. The electricity generated from these sources may be used to provide power to the electrolysers.

Preferably, the process will be self-contained in terms of power generation for the electrolysis. Thus, preferably the entire electricity demand for the electrolysis is met using renewable power sources.

It is envisaged, however, that electricity generated from one or more renewable energy sources may be supplemented by other sources either during periods of particularly high demand for product(s) from the downstream process(es) and/or during periods when the renewable power source is only available below the threshold required to meet demand, or is not available at all. In these cases, additional electricity may be taken from onsite battery storage and/or generated from one or more onsite petrol-, diesel- or hydrogen-powered generator(s), including fuel cells and/or taken from a local or national grid.

The electrolysis may be carried out at any suitable scale, in some cases having a total capacity of less than 1 GW. However, in preferred embodiments the electrolysis has a total capacity of at least 1 gigawatt (GVV). The maximum total capacity of the electrolysis is limited only by practical considerations, e.g. generating sufficient power from the renewable energy sources to power the plurality of electrolysers. Thus, the electrolysis may have a maximum total capacity of about 10 GW or more. The total capacity of the electrolysis may be from 1 GW to about 5 GW, e.g. from about 1.5 GW to about 3 GW, for example.

The hydrogen gas is typically generated by the electrolysis at pressure slightly higher than atmospheric pressure, e.g. about 1.3 bar. However, in some embodiments, the electrolysis produces hydrogen at a somewhat higher pressure, for example up to about 3 bar.

Thus, hydrogen gas is usually fed to the multistage compression system at a pressure in the range from atmospheric pressure to about 5 bar, e.g. from atmospheric pressure to about 3 bar, preferably in the range from atmospheric pressure to about 1.5 bar, e.g. about 1.1 bar.

In some embodiments, the amount of hydrogen gas produced by the electrolysers is variable and so during periods where there is insufficient hydrogen gas produced by electrolysis, hydrogen gas may be fed to the multistage compression system from another source, e.g. a hydrogen storage system as explained below.

Purification

In preferred embodiments where the gas for compression is hydrogen gas produced by electrolysis, it will be noted that hydrogen gas produced by electrolysis is typically saturated with water at 40° C. Thus, this hydrogen gas usually contains some residual oxygen gas, typically about 500 to about 1000 ppm(v). These impurities will usually have to be removed, depending on the tolerances of any downstream process(es).

In this regard, oxygen is a poison for conventional catalysts used in the Haber process. Thus, in embodiments in which the downstream process is ammonia synthesis, the feed to the catalyst will contain less than about 10 ppm, typically less than about 5 ppm, total oxygen, i.e. oxygen atoms from any impurity source such as oxygen gas ($O_2$), water ($H_2O$), carbon monoxide (CO) and/or carbon dioxide ($CO_2$). Accordingly, the feed will also be dry, i.e. no more than 1 ppm water.

Downstream processes using conventional "grey" hydrogen (i.e. hydrogen derived from a hydrocarbon or carbonaceous feed stream without capture of carbon dioxide, e.g. by reforming natural gas), or "blue" hydrogen (i.e. hydrogen derived in the same way as grey hydrogen but where some or all of the carbon dioxide associated with production is captured), such as refineries, have similar tolerances for oxygen and water. However, hydrogen liquefaction usually has a tighter specification and requires no more than 10 ppb water and 1 ppm oxygen in the feed.

The compressed hydrogen gas produced by the electrolysis is preferably purified prior to being fed to the downstream process. In this regard, the residual oxygen gas in the compressed hydrogen gas may be converted into water by catalytic combustion of some of the hydrogen to produce oxygen-depleted compressed hydrogen gas (containing no more than 1 ppm $O_2$) which may then be dried to produce dry compressed hydrogen gas (containing no more than 1 ppm water) for use in the downstream process(es).

Multistage Compression System

The multistage compression system is responsible for compressing gas from the pressure at which the gas is generated to an elevated pressure. For example, where at least some of the compressed gas is fed to at least one downstream process, the elevated pressure will generally be a pressure that is at least little higher than the feed pressure of said downstream process(es).

As will be readily appreciated, a "multistage" compression system has a plurality of stages of compression that may be split between compressors in parallel and/or in series. The overall pressure ratio across each stage is generally in the range of about 1.5 to about 2.5, e.g. about 2 to about 2.5, in order to limit the increase in temperature of the compressed gas.

Coolers are typically required between adjacent stages ("inter-coolers") and typically required after a final stage ("after-coolers") in multistage compression systems to remove heat of compression from compressed gas. Thus, in the context of the present invention, a "stage" of compression refers to the part of the compression system between coolers.

The compressed hydrogen gas produced by the multistage compression system typically has a pressure from about 10 bar to about 50 bar. In some embodiments, the pressure of the compressed hydrogen gas is from about 25 bar to about 35 bar, preferably about 30 bar. In other embodiments, the pressure of the compressed hydrogen gas is from about 10 bar to about 12 bar, preferably about 11 bar.

In some embodiments, the multistage compression system has only a single section to compress the hydrogen gas to the desired elevated pressure. In other embodiments, the multistage compression system comprises a first section and at least one further section downstream of the first section.

In particular embodiments, the multistage compression system has two sections, a first (low pressure or "LP") section in which hydrogen gas is compressed from the feed pressure to the multistage compression system to a first elevated pressure in the range from about 2 bar to about 6 bar, and a second (medium pressure or "MP") section in which hydrogen gas is compressed from the first elevated pressure to the final elevated pressure desired for the downstream process(es).

In some embodiments, the first elevated pressure of the hydrogen gas after compression in the first section may be in the range of about 2 bar to about 3 bar, e.g. 2.5 bar. In other embodiments, the first elevated pressure may be in the range of about 4 bar to about 6 bar, e.g. 5 bar.

In preferred embodiments, the multistage compression system will comprise phase separators upstream of each stage of compression to remove liquid water. For LP centrifugal compressors, the phase separator will usually be combined into the intercooler as a single unit to potentially enable capital and power benefits and simplify the system.

Downstream Process(es)

In some embodiments, the compressed gas may be consumed in a downstream process, or in more than one downstream process arranged in parallel.

In preferred embodiments where the gas for compression is hydrogen gas, the downstream process(es) could include any process that would currently use "grey" hydrogen or "blue" hydrogen. Such processes include oil refining and steel manufacture.

In still preferred embodiments, at least some, e.g. all, of the compressed gas is hydrogen gas used to produce ammonia via the Haber (or Haber-Bosch) process. In this process, ammonia is produced by reacting a mixture of hydrogen and nitrogen gases over an iron-based catalyst at high temperature, typically at about 400° C. to about 500° C., and at high pressure, typically at a pressure in the range from about 100 bar to 200 bar.

In other preferred embodiments, at least some, e.g. all of the compressed gas is hydrogen gas used to produce methanol, e.g. via $CO_2$ hydrogenation.

In some embodiments, at least some, e.g. all, of the compressed gas is hydrogen gas used to produce ammonia and/or methanol.

In other embodiments, at least some, e.g. all, of the compressed hydrogen gas is liquefied by cryogenic cooling.

In still further embodiments, a first part of the compressed hydrogen gas is used to produce ammonia and a second part of the compressed hydrogen gas is liquefied.

Apparatus

According to a second aspect of the present invention, there is provided an apparatus for operating a multistage compression system for compressing gas according to the process of the invention described herein, said apparatus comprising:

a multistage compression system for compressing gas, said multistage compression system comprising a feed end, at least one centrifugal compressor incorporating at least one dry gas seal with opposed seal faces, and an outlet end;

a control system for switching the or each centrifugal compressor between a normal power mode and a low power mode, as required, based on the flow of the gas feed to the multistage compression system.

Electricity Generation System

In some preferred embodiments, the apparatus comprises an electricity generation system for generating electricity from at least one renewable energy source, and wherein the gas for compression is produced at least in part using electricity generated from said electricity generation system.

Electricity for producing the gas for compression (and possibly for powering the or each centrifugal compressor of the multistage compression system) is generated from at least one renewable energy source, e.g. wind energy and/or solar energy.

It is preferred that, in order to reduce environmental impact, that the process will be self-contained in terms of power generation for producing gas for compression (and optionally powering the centrifugal compressor(s)). Thus, preferably the entire electricity demand is met using renewable power sources, without supplementing said sources using non-renewable energy. In such instances, it is preferred that the demand for compressed gas is met by feeding gas from a suitable storage system, before consideration of using any non-renewable energy sources is made.

However, there may not be sufficient gas available to be fed from said storage system, for example. Thus, in some embodiments the electricity generation system comprises onsite battery storage and/or one or more onsite petrol-, diesel- or hydrogen-powered generator(s). Electricity from said battery storage and/or one or more onsite petrol-, diesel- or hydrogen-powered generator(s) may be used to supplement additional electricity either during periods of particularly high demand of, for example, product(s) from the downstream process(es) and/or during periods when the renewable power source is only available below the threshold required to meet said demands of the process, or is not available at all.

In embodiments in which wind energy is used to generate electricity, the electricity generation system will comprise a plurality of wind turbines. In embodiments in which solar energy is used to generate electricity, the electricity generation system will comprise a plurality of photovoltaic cells, or "solar cells".

Some embodiments will comprise a plurality of wind turbines and a plurality of photovoltaic cells.

The expression "electrically conductive communication" will be understood to mean that appropriate wires and/or cables will be used, together with any other relevant equipment, to connect the electricity generation system with the or each compressor in a safe and efficient manner.

In the context of the present invention, the or each centrifugal compressor may also be driven by a dedicated variable frequency drive, a mechanical drive or a two-speed motor.

In some preferred embodiments, the electricity generation system also generates electricity for powering the centrifugal compressor(s) of the multistage compression system and/or any downstream process(es).

Multistage Compression System

As mentioned above, the multistage compression system comprises a plurality of stages, each stage typically having a compression ratio in the range of about 2 to about 2.5. Inter-coolers are typically provided between adjacent stages, and after-coolers may be required after a final stage.

The stages of a multistage compression system may be arranged in at least two compression sections, a first and a further section downstream of said first section.

Each section may comprise one or more stages of compression, together with the associated coolers. Phase separators may also be included upstream of each compression stage to remove liquids from the hydrogen gas to be compressed.

In particular embodiments, the multistage compression system has two sections, a first (low pressure or "LP") section in which hydrogen gas is compressed from the feed pressure to the multistage compression system to a first elevated pressure, and a further (medium pressure or "MP") section in which hydrogen gas is compressed from the first elevated pressure to the final elevated pressure desired for the downstream process(es).

An LP section may have one or more, e.g. two, stages of compression and an MP section may have two or more, e.g. 3 or 4, stages of compression.

The number of compressors used will depend on the total capacity of the process. By way of example, for a process having a total electrolysers capacity of 2.2 GW (for producing hydrogen gas), the multistage compression system may have from 8 to 10 compressors. The skilled person would appreciate that a process having a higher total capacity would require a greater number of compressors.

Compressors in an LP section may be oversized as appropriate, e.g. by 10%, to accommodate the loss of a machine. Additionally or alternatively, the multistage compression system may comprise a spare compressor in either the LP or an MP section which would cut-in to replace another machine in the relevant section that had broken down.

Control System

The apparatus comprises a control system for switching the or each centrifugal compressor between a normal power mode and a low power mode, as required, based on the flow of the gas feed to the multistage compression system.

In embodiments where there is an electricity generation system that dictates the flow of the gas feed, the electricity generation system generates electricity from at least one renewable energy source. However, as mentioned above in some embodiments the electricity generation system further comprises onsite battery storage and/or generates electricity from one or more onside petrol-, diesel- or hydrogen-powered generator(s). In such embodiments, the apparatus comprises a control system for switching the or each centrifugal compressor between a normal power mode and a low power mode, as required, based on the level of electricity generated by the at least one renewable energy source(s) and onsite battery storage and/or one or more onside petrol-, diesel- or hydrogen-powered generator(s) of said electricity generation system.

It will be appreciated that the control system is in electrical communication with the or each centrifugal compressor in the multistage compression system.

The control system implements the process of the invention. The two modes, "low power mode" and "normal power mode", when described in relation to the control system may have the same features as described herein in relation to the process of the invention.

The control system is thus configured to:
(a) during periods when the gas flow through the centrifugal compressor(s) is sufficient for normal operation of said multistage compression system, instruct said centrifugal compressor(s) to operate in a normal power mode; and
(b) during periods when the gas flow to the centrifugal compressor(s) is not sufficient for normal operation of said multistage compression system, instruct the centrifugal compressor or, if more than one, at least one centrifugal compressor to operate in a low power mode at least sufficient to prevent contact of said opposed seal faces of said dry gas seal in said centrifugal compressor(s).

In some embodiments, the control system simply calculates, based on the gas flow to the multistage compression system (and optionally for powering centrifugal compression), how many centrifugal compressors are to be operated in low power mode or normal power mode, and then signals each to operate as such.

Thus, the control system dictates the most efficient way to operate the centrifugal compressor(s) of the multistage compression system, without unduly shutting down the centrifugal compressors. This increases the lifetime of the compressors by reducing wear of the dry gas seals and minimizing frequency of repairs and costs. This may also allow for more electricity to be "freed up" for other parts of the process, e.g. gas production, or any downstream process(es).

Electrolysers

In some preferred embodiments the gas for compression is hydrogen gas, preferably produced by electrolysis of water. Thus, in said embodiments, the apparatus comprises a plurality of electrolysers for producing hydrogen gas, wherein said feed end of said multistage compression system is in fluid flow communication with said plurality of electrolysers. The electrolysers are powered at least in part by electricity generated from said electricity generation system.

The electrolysis of water may be provided by a plurality of electrolysis units or "cells". Each unit or cell may be referred to as an "electrolyser".

The plurality of electrolysers typically has a total capacity of at least 1 GW, but in some instances the capacity may be less than 1 GW. The maximum total capacity of the electrolysers is limited only by practical considerations, e.g. generating sufficient power from the renewable energy source(s) to power the plurality of electrolysers. Thus, the electrolysers may have a maximum total capacity of 10 GW or more. The total capacity of the electrolysers conducting the electrolysis may be from 1 GW to 5 GW, e.g. from about 1.5 GW to about 3 GW.

The plurality of electrolysers usually consists of a large number, e.g. hundreds, of individual cells combined into "modules" that also include process equipment, e.g. pumps, coolers, and/or separators, etc., and groups of these modules are typically arranged in separate buildings.

Each module typically has a maximum capacity of at least 10 MW, e.g. 20 MW, and each building typically has a total capacity of at least 100 MW, e.g. 400 MW.

Any suitable type of electrolyser may be used with the present invention. In this regard, there are three conventional types of electrolyser—alkaline electrolysers, PEM electrolysers and solid oxide electrolysers—and each of these types of electrolyser is in theory suitable for use with the present invention.

Alkaline electrolysers operate via transport of hydroxide ions ($OH^-$) through the electrolyte from the cathode to the anode with hydrogen being generated on the cathode side. Electrolysers using a liquid alkaline solution of sodium hydroxide or potassium hydroxide as the electrolyte are commercially available. Commercial alkaline electrolysers typically operate at a temperature in the range of about 100° C. to about 150° C.

In a PEM electrolyser, the electrolyte is a solid plastics material. Water reacts at the anode to form oxygen and positively charged hydrogen ions. The electrons flow through an external circuit and the hydrogen ions selectively move across the PEM to the cathode. At the cathode, hydrogen ions combine with electrons from the external circuit to form hydrogen gas. PEM electrolysers typically operate at a temperature in the range of about 70° C. to about 90° C.

Solid oxide electrolysers use a solid ceramic material as the electrolyte that selectively conducts negatively charged oxygen ions ($O^{2-}$) at elevated temperatures. Water at the cathode combines with electrons from the external circuit to form hydrogen gas and negatively charged oxygen ions. The oxygen ions pass through the solid ceramic membrane and react at the anode to form oxygen gas and generate electrons for the external circuit. Solid oxide electrolysers must operate at temperatures high enough for the solid oxide membranes to function properly, e.g. at about 700° C. to about 800° C.

Due to the lower operating temperatures, the use of alkaline electrolysers and/or PEM electrolysers are typically preferred.

The plurality of electrolysers may be arranged in at least two parallel groups. In these embodiments, the apparatus comprises:

a first header to collect hydrogen gas from each electrolyser in each group; and
a second header to collect hydrogen gas from the first headers and feed the hydrogen gas to the feed end of the multistage compression system;

In some embodiments wherein the apparatus further comprises a storage system for storing compressed hydrogen gas, the apparatus further comprises a conduit for feeding compressed hydrogen gas from a storage system after suitable pressure reduction to the second header.

Any suitable source of water may be used with these embodiments of the present invention. However, in embodiments in which sea water is used to produce the water for the electrolysis, the apparatus would further comprise at least one unit (or plant) for desalination and demineralization of the sea water.

Purification System

In some embodiments where there is a downstream process(es) that cannot tolerate the levels of water and oxygen inherently present in the compressed hydrogen gas produced by the electrolysis of water, the apparatus may comprise a purification system in which the compressed hydrogen gas is purified.

The purification system will typically comprise a "DeOxo" unit in which oxygen is removed by the catalytic combustion of hydrogen to produce water and oxygen-depleted compressed hydrogen gas.

The oxygen-depleted gas may then be dried in a drier, e.g. an adsorption unit, such as a temperature swing adsorption (TSA) unit, to produce dry compressed hydrogen gas for the downstream process(es).

Downstream Processing Unit(s)

In some embodiments, the apparatus comprises at least one downstream processing unit for consuming compressed gas, said downstream processing unit(s) being in fluid flow communication with said outlet end of said multistage compression system.

A downstream processing unit may be any unit that utilizes gas (e.g. hydrogen gas) as a feedstock.

Examples of suitable downstream processing units include an oil refinery, a steel manufacturing facility, an ammonia synthesis plant or a hydrogen liquefaction plant. In some embodiments, there is both an ammonia synthesis plant and a hydrogen liquefaction plant arranged in parallel.

In particularly preferred embodiments the downstream processing unit(s) includes an ammonia synthesis plant, e.g. using the Haber (Haber-Bosch) process, and/or a methanol synthesis plant, e.g. using $CO_2$ hydrogenation.

Storage System

In some embodiments, the apparatus comprises a storage system for storing compressed gas, said storage system being in fluid flow communication with said outlet end of said multistage compression system and at least one compressor of said multistage compression system.

The storage system typically comprises a number of pressure vessels and/or pipe segments connected to a common inlet/outlet header.

The pressure vessels may be spheres, e.g. up to about 25 m in diameter, or "bullets", i.e. horizontal vessels with large L/D ratios (typically up to about 12:1) with diameters up to about 12 m.

Salt domes may also be used if the geology of the site allows.

In some embodiments the apparatus comprises a second control system that controls not only the pressure and flow of compressed from the multistage compression system to the storage system, e.g. during periods when gas production exceeds demand, but also the pressure and flow of compressed gas to the multistage storage system, e.g. during periods when gas demand exceeds production.

It will be appreciated that this second control system could be integral with, or separate to, the control system described above in relation to the power mode of the centrifugal compressor(s).

In some embodiments, the second control system would simply seek to maintain the pressure of gas in a downstream header to a downstream process. Thus, in order to continually provide a given amount of gas to the downstream process, a pressure controller would be maintained on a discharge header that feeds the downstream process.

If the pressure in the discharge header exceeded the required feed pressure (e.g. because there is more gas available than the downstream process is consuming), the pressure would be relieved by opening a valve in the feed line to storage.

Once the pressure in the discharge header dropped to the required feed pressure, the valve in the feed line to storage would be closed.

If the pressure in the discharge header dropped below the required feed pressure (e.g. because there is less gas available than the downstream process is consuming), the pressure would be increased by opening a valve in a first return line from storage to a first stage in the multistage compression system.

The valve in the first return line would remain open until such time that the pressure in the discharge header exceeded the required feed pressure, indicating that the level of gas production has returned to the required level, at which point the valve would be closed, or until the pressure in the storage vessel drops to about the inlet pressure to the first stage of multistage compression system being fed by the first return line.

In the latter case, not only would the valve in the first return line be closed, but also a valve in a second return line from storage to a second stage in the multistage compression system (upstream of the first stage) would be opened so as to continue to feed gas from storage back to the downstream process.

Such a control system may be referred to as a "split range" control system.

Aspects of the invention include:

1. A process for operating a multistage compression system for compressing gas feed having a variable flow rate, said multistage compression system comprising at least one centrifugal compressor incorporating a dry gas seal with opposed seal faces, said process comprising:
(a) during periods when the flow rate of the gas through the centrifugal compressor(s) is sufficient for normal operation of said multistage compression system, operating said centrifugal compressor(s) in a normal power mode; and
(b) during periods when the flow rate of the gas through the centrifugal compressor(s) is not sufficient for normal operation of said multistage compression system, operating the centrifugal compressor or, if more than one, at least one centrifugal compressor in a low power mode at least sufficient to prevent contact of said opposed seal faces of said dry gas seal in said centrifugal compressor(s).

2. A process according to #1, wherein during operation in said low power mode said the or at least one centrifugal compressor is operating with a power of about 20% or less relative to maximum power and producing no net compressed gas.

3. A process according to #1 or #2, wherein during operation in said low power mode said the or at least one centrifugal compressor is operating with a rotor speed in a range from about 100 rpm to about 1500 rpm and producing no net compressed gas.

4. A process according to any of #1 to #3, wherein during operation in said normal power mode the or at least one centrifugal compressor is operating with a power of about 70% or more relative to maximum power and optionally producing at least some net compressed gas.

5. A process according to any of #1 to #4, wherein the multistage compression system comprises at least one further compressor, and wherein during said periods specified in (b), the process comprises compressing gas in said further compressor(s).

6. A process according to any of #1 to #5, wherein the gas for compression is hydrogen gas.

7. A process according to #6, wherein the hydrogen gas is produced by electrolysis of water.

8. A process according to #6 or #7, wherein said gas is fed to said further compressor(s) by withdrawing compressed hydrogen gas from storage and, after suitable pressure reduction, feeding said reduced pressure hydrogen gas to said further compressor(s), said further compressor(s) being downstream of said centrifugal compressor(s) in said low power mode.

9. A process according to any of #5 to #8, comprising feeding said compressed hydrogen gas to at least one downstream process for consumption in said downstream process(es).

10. A process according to #9, wherein at least some of the compressed hydrogen gas is used to produce ammonia and/or methanol in the downstream process(es).

11. A process according to #9 or #10, wherein during said periods specified in (b), said process comprises withdrawing compressed hydrogen gas from storage and, after suitable pressure reduction, feeding said reduced pressure hydrogen gas to said downstream process(es).

12. An apparatus for operating a multistage compression system for compressing gas according to #1, said apparatus comprising:
a multistage compression system for compressing gas, said multistage compression system comprising a feed end, at least one centrifugal compressor incorporating at least one dry gas seal with opposed seal faces, and an outlet end;
a control system for switching the or each centrifugal compressor between a normal power mode and a low power mode, as required, based on the flow of the gas feed to the multistage compression system.

13. An apparatus according to #12, comprising:
an electricity generation system for generating electricity from at least one renewable energy source, and wherein the gas for compression is produced at least in part using electricity generated from said electricity generation system.

14. An apparatus according to #12 or #13, comprising
a plurality of electrolysers for producing hydrogen gas, wherein the electrolysers are powered at least in part by electricity generated from said electricity generation system, and
wherein said feed end of said multistage compression system is in fluid flow communication with said plurality of electrolysers.

15. An apparatus according to any of #12 to #14, comprising at least one downstream processing unit for consuming compressed gas, said downstream processing unit(s) being in fluid flow communication with said outlet end of said multistage compression system.

16. An apparatus according to any of #12 to #15, comprising:
- a storage system for storing compressed gas, said storage system being in fluid flow communication with said outlet end of said multistage compression system and at least one compressor of said multistage compression system; and
- a second control system for controlling pressure and flow of compressed gas from said multistage compression system to said storage system and for controlling pressure and flow of compressed gas from said storage system to said compressor(s) of said multistage compression system based on the flow of the gas feed to the multistage compression system.

BRIEF DESCRIPTION OF THE DRAWINGS

The invention will now be described by example only and with reference to the figures in which.

DETAILED DESCRIPTION OF THE DRAWINGS

Figure 1:
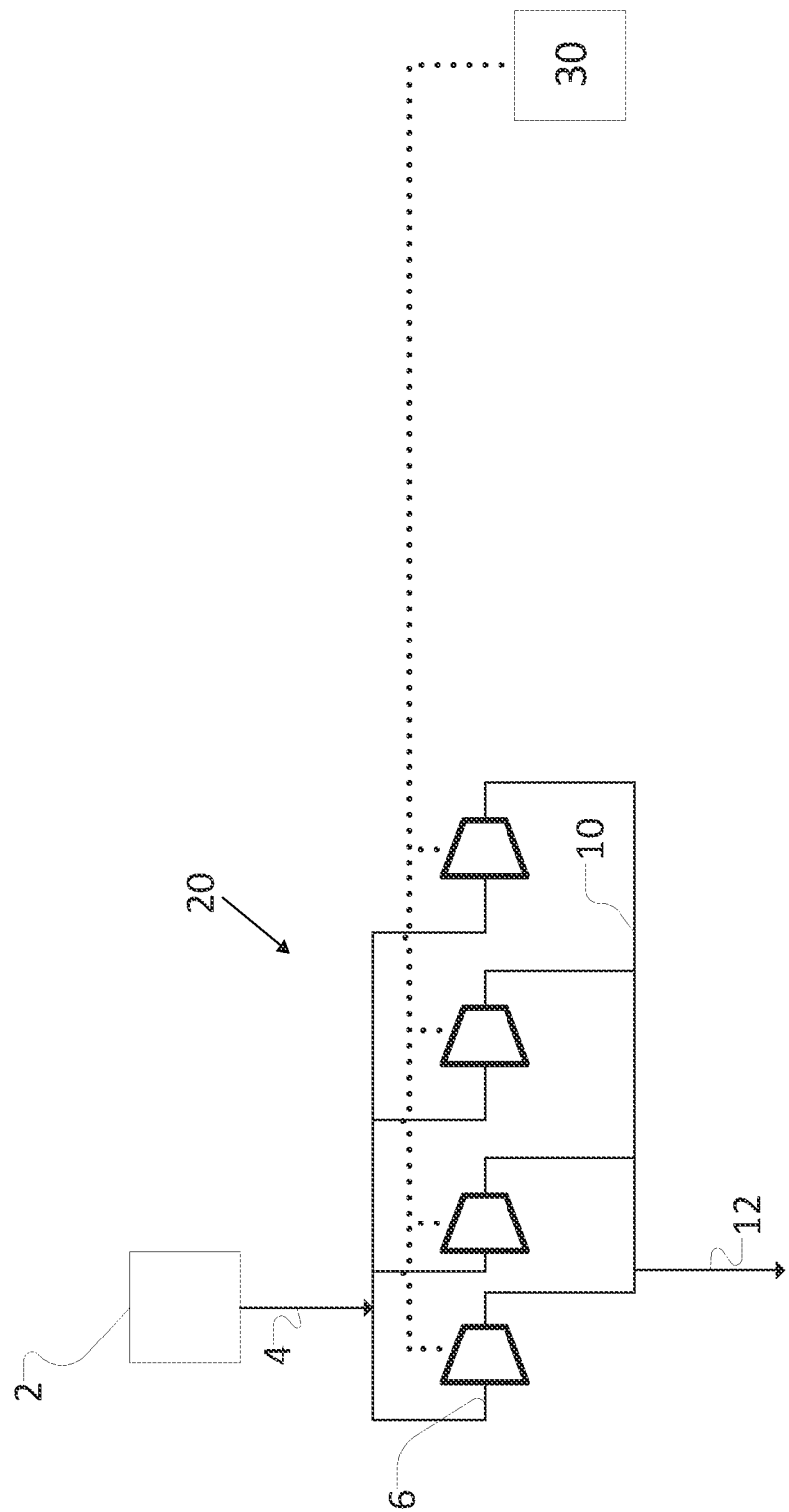
FIG. 1 is a simplified flowsheet for a first embodiment of the present invention.

According to FIG. 1, hydrogen is produced at about atmospheric pressure by electrolysis of water in a plurality of electrolyser units indicated generally by reference numeral 2.

A stream 4 of hydrogen gas is removed from the electrolysers 2 at a pressure just over atmospheric pressure (e.g. about 1.1 bar) and is fed a multistage compression system 20 to produce a stream 12 of compressed hydrogen gas. In this example, the multistage compression system 20 comprises four centrifugal compressors, indicated generally with reference numeral 6, that are arranged in parallel.

The electricity required to power the electrolysers 2 is generated at least in part by renewable energy sources (not shown) such as the wind and/or the sun. In some embodiments, however, at least some additional electricity may be taken from onsite battery storage and/or generated from one or more onsite petrol-, diesel- or hydrogen-powered generator(s), including fuel cells and/or taken from a local or national grid (not shown).

Compressed hydrogen gas from each of the centrifugal compressors 6 is fed to header 10 and forms the combined stream 12 of compressed hydrogen gas. Combined stream 12 may be fed to a downstream stage of compression (not shown) or at least one downstream process (not shown).

Each centrifugal compressor 6 is electrically connected to a control system, indicated by reference numeral 30. The control system 30 monitors the amount of gas flow to the multistage compression system and instructs one or more of the centrifugal compressors 6 to be in a low power mode or normal power mode (or to switch between them), as required.

For instance, during periods when the electricity generated from the renewable energy source(s) (and optionally electricity from onside battery storage and/or one or more onside petrol-, diesel- or hydrogen-powered generator(s)) (not shown), and hence the gas flow through the centrifugal compressors, is sufficient for normal operation of said multistage compression system 20, the control system 30 instructs four said centrifugal compressor(s) 6 to operate in a normal power mode (i.e. in a maximum, turndown, or recycle operation).

However, during periods when the electricity generated from the renewal energy source(s) (and optionally electricity from onside battery storage and/or one or more onside petrol-, diesel- or hydrogen-powered generator(s)) (not shown), and hence the gas flow through the centrifugal compressors is not sufficient for normal operation of said multistage compression system 20, the control system 30 instructs one, two, three, or all four of the centrifugal compressors 6 to operate in a low power mode, as required. As described herein, this low power mode is at least sufficient to prevent contact of the opposed seal faces of the dry gas seal in said the or each centrifugal compressor 6 in said low power mode.

Although not shown for brevity, the multistage compression system typically comprises inter-coolers between stages of compression and after-coolers after the final stage. There may also be phase separators upstream of each stage of compression to remove liquid from the stream entering the compression stages.

Figure 2:
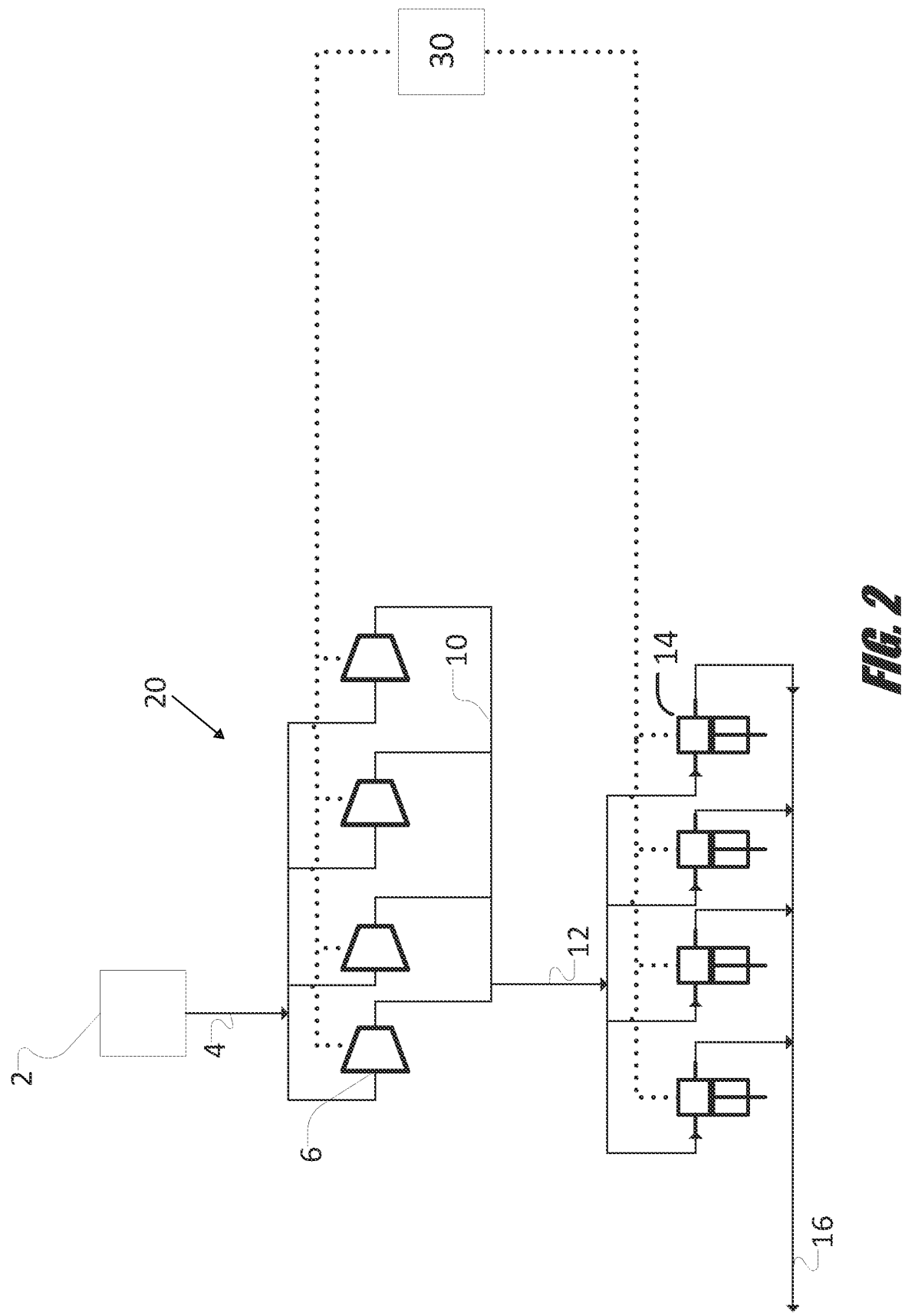
FIG. 2 is a simplified flowsheet for a second embodiment of the present invention.

FIG. 2 depicts a second embodiment of the present invention. The same numerical references have been used to denote features of the flowsheet in FIG. 2 that are common to the flowsheet of FIG. 1. The following is a discussion of the features that distinguish the first embodiment of FIG. 2 from the process shown in FIG. 1.

Regarding FIG. 2, the multistage compression system 20 has an LP section containing the four centrifugal compressors 6 arranged in parallel, and also comprises an MP section containing four reciprocating compressors, denoted generally with the reference numeral 14, that are arranged in parallel.

Stream 4 of hydrogen gas is fed to the LP section where it is compressed from about 1.1 bar to about 5 bar and fed to header 10 to produce combined stream 12. Combined stream 12 is then fed to the MP section with reciprocating compressors 14 where it is compressed further to produce stream 16 that is at a pressure about 1 bar above the pressure of any downstream process(es) (not shown).

In this figure, the control system 30 again monitors the amount of gas flow (e.g. based on electricity available) and instructs one or more of the centrifugal compressors 6 to be in a low power mode or normal power mode (or to switch between them), as required.

However, the presence of the downstream section of compression comprising four reciprocating compressors 14 allows for the multistage compression system to continue compressing hydrogen gas even when the flow of net compressed gas is reduced due to one or more of the centrifugal compressors 6 operating in low power mode, for example by feeding hydrogen gas to compressors 14 from storage.

Figure 3:
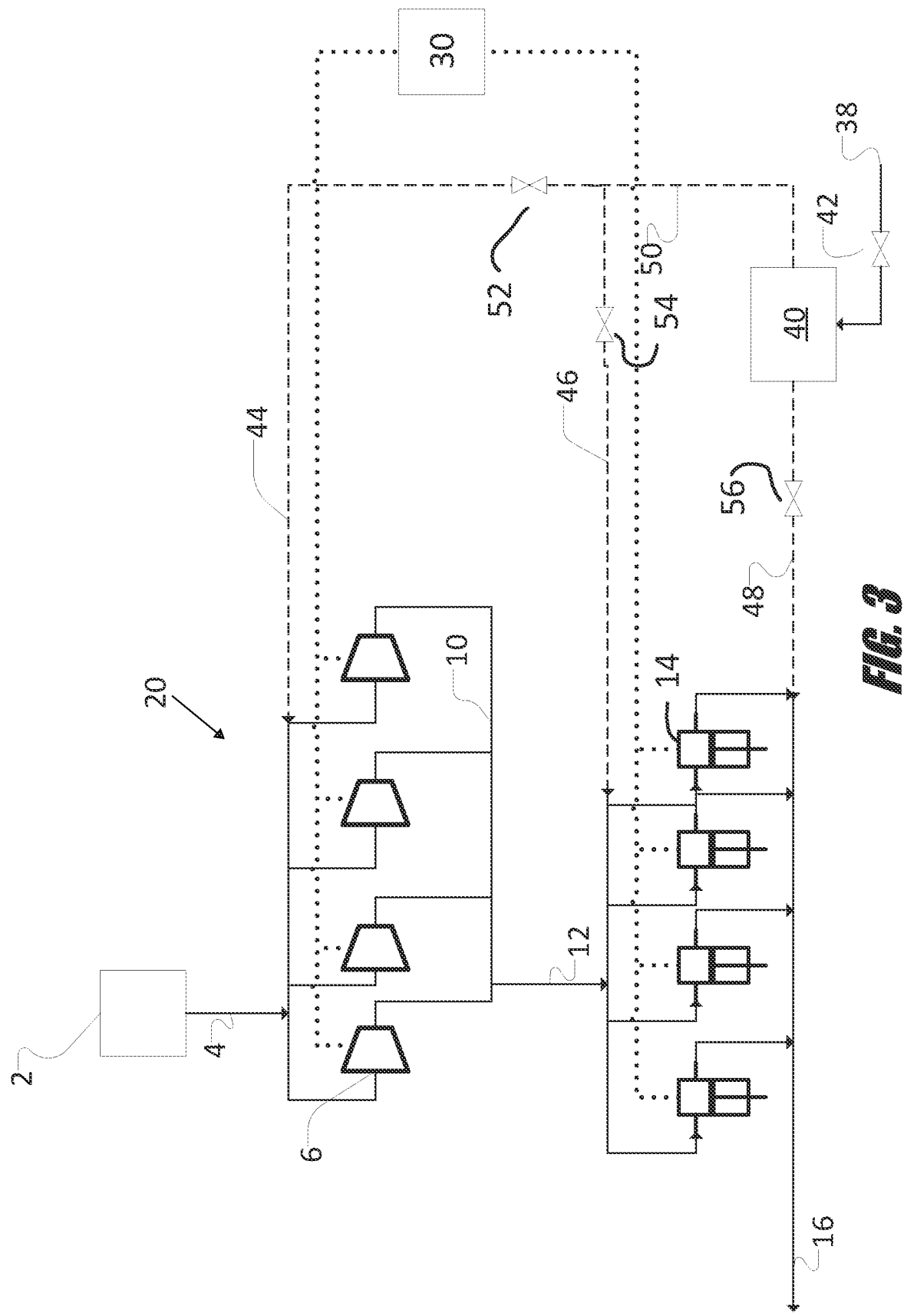
FIG. 3 is a simplified flowsheet for a third embodiment of the present invention.

FIG. 3 depicts a second embodiment of the present invention. The same numerical references have been used to denote features of the flowsheet in FIG. 3 that are common to the flowsheet of FIG. 2. The following is a discussion of the features that distinguish the first embodiment of FIG. 3 from the process shown in FIG. 2.

Regarding FIG. 3, the apparatus shown comprises a storage system 40.

Dry hydrogen gas may be stored in the storage system 40 up to a maximum pressure of the feed pressure to a downstream process, e.g. for an ammonia plant, about 26 bar. In these embodiments, stream 38 of compressed hydrogen gas is taken from the outlet of the multistage compression system, adjusted in pressure as appropriate across valve 42 and fed to the storage system 40.

Alternatively, the hydrogen may be stored at higher pressure, e.g. up to a maximum pressure of 50 bar or even 100 bar or more. In such embodiments, stream 38 of hydrogen gas has been removed from the outlet of the multistage compression system, compressed in a storage compression system, and is adjusted in pressure across valve 42 as required before being fed to the storage system 40.

During periods when demand for hydrogen exceeds production, hydrogen from the storage system 40 may be fed in stream 48, after suitable pressure reduction (e.g. across valve 56), directly to the hydrogen feed in stream 16 to a downstream process (not shown). In some embodiments, hydrogen withdrawn from storage may be fed in stream 46, after suitable pressure reduction (e.g. across valve 54), to a point between the LP section and the MP section of the multistage compression system 20. In still further embodiments, hydrogen withdrawn from storage may be fed in stream 44, after suitable pressure reduction (e.g. across valve 52), to the feed to the LP section comprising centrifugal compressors 6.

In some embodiments, hydrogen gas withdrawn from storage is fed in stream 48 to a downstream process (not shown) until the pressure in the storage system falls to about the feed pressure to the downstream process at which point valve 56 would be closed and valve 54 opened. The withdrawn hydrogen gas may then be fed in stream 46 to the point between the sections of the multistage compression system 20 until the pressure in the storage system falls to about the feed pressure to the MP section. At this point, valve 54 is closed and valve 52 opened thereby providing withdrawn hydrogen gas in stream 44 to the feed to the LP section of multistage compression system 20.

This sequential approach to feeding hydrogen from storage to the downstream process has an advantage in that it represents a more energy efficient method for returning hydrogen to the process during periods where demand exceeds production compared to feeding hydrogen from storage only through line 48.

In some preferred embodiments according to the present invention, during periods where one or more centrifugal compressors 6 are operating in a low power mode, hydrogen withdrawn from storage may be fed in stream 46, after suitable pressure reduction (e.g. across valve 54), to a point between the LP section and the MP section of the multistage compression system 20. A second control system (optionally integral with the first control system) may control the flow of withdrawn hydrogen through valve 54 such that the flow of compressed hydrogen gas flow from the centrifugal compressors 6 is supplemented with hydrogen gas from storage.

This has the further advantage of ensuring that there is minimal drop in the flow of net compressed hydrogen gas from stream 16 to a downstream process (not shown) despite one or more centrifugal compressors 6 operating in a low power mode.

Figure 4:
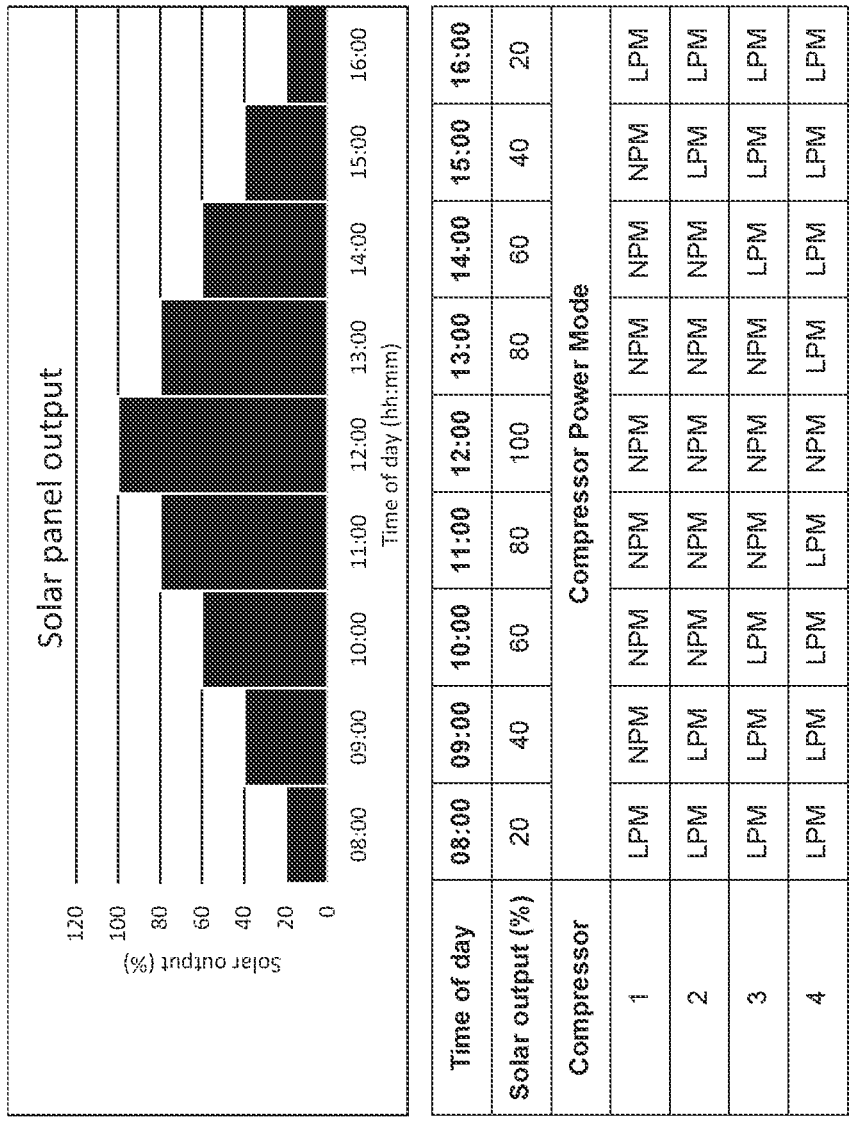
FIG. 4 is a bar chart and table providing an example of the process of the present invention in the context of four centrifugal compressors arranged in parallel powered by a renewable energy source.

FIG. 4 shows a graph with an example of a renewable energy source output. It will be appreciated that the data for the renewable energy source is for illustrating an example of the invention only and is not intended to reflect real values of solar energy output.

This example uses only solar energy as the renewable energy source, but it will be appreciated that this example could be extrapolated to one of, or a combination of, the other renewable energy sources, onsite battery storage, or energy from one or more onsite petrol-, diesel- or hydrogen-powered generator(s), as mentioned herein. Solar energy is used in this example in order to simplify the example data for the purpose of explanation—it will be appreciated that using a combination of renewable and non-renewable energy sources will present a much more complicated energy output graph, for example, but work on the same principles as described herein.

As can be seen from the graph in FIG. 4 (top), the amount of electricity generated from solar energy varies across the day (08:00 to 16:00). In this example, the electricity generated by solar energy is used to power electrolysers and thus correlates to the amount of gas produced for compression. This gas is then compressed in four centrifugal compressors arranged in parallel within a multistage compression system such as the one shown in FIGS. 1 to 3. Data for the operation of said centrifugal compressors are shown in the table of FIG. 4, with each centrifugal compressor labelled 1 to 4 respectively.

The table shown in FIG. 4 demonstrates the number of centrifugal compressors which are operating in, or switched to, a low power mode or normal power mode, depending on the gas flow produced, which is based on the amount of electricity generated from the solar energy source.

From the table in FIG. 4 it can be seen that:
(i) at 08:00 there is 20% of the total electricity being generated from the solar energy source, and so there is not sufficient energy to provide enough gas flow for compression in all four centrifugal compressors (1, 2, 3, 4) in a normal power mode (NPM), which are therefore in a low power mode (LPM);
(ii) at 09:00 there is 40% of the total electricity being generated from the solar energy source, and so there is sufficient energy to provide enough gas flow for compression in one centrifugal compressor (1) in a normal power mode (NPM) and three centrifugal compressors (2, 3, 4) are in a low power mode (LPM);
(iv) at 10:00 there is 60% of the total electricity being generated from the solar energy source, and so there is sufficient energy to provide enough gas flow for compression in two centrifugal compressors (1, 2) in a normal power mode (NPM) and two centrifugal compressors (3, 4) are in a low power mode (LPM);
(v) at 11:00 there is 80% of the total electricity being generated from the solar energy source, and so there is sufficient energy to provide enough gas flow for compression in three centrifugal compressors (1, 2, 3) in a normal power mode (NPM) and one centrifugal compressor (4) is in a low power mode (LPM); and
(vi) at 12:00 there is 100% of the total electricity being generated from the renewable energy source, and so there is sufficient energy to provide enough gas flow for compression in all four centrifugal compressors (1, 2, 3, 4) in a normal power mode (NPM).

It will be appreciated that the example shown is FIG. 4 can also be described using the general formulae given above.

In the example shown in FIG. 4, it can be seen that none of the centrifugal compressors are being completely shut down in response to a lack of available electricity generated from said solar energy source throughout the day. Thus, this allows for the number of centrifugal compressors in said low power mode or said normal power mode to be such that the amount of electricity available is conserved as much as possible without unduly shutting down the or at least one centrifugal compressor. This therefore reduces wear of the dry gas seals and extends the lifetime of the centrifugal compressor(s), reducing costs.

Figure 5:
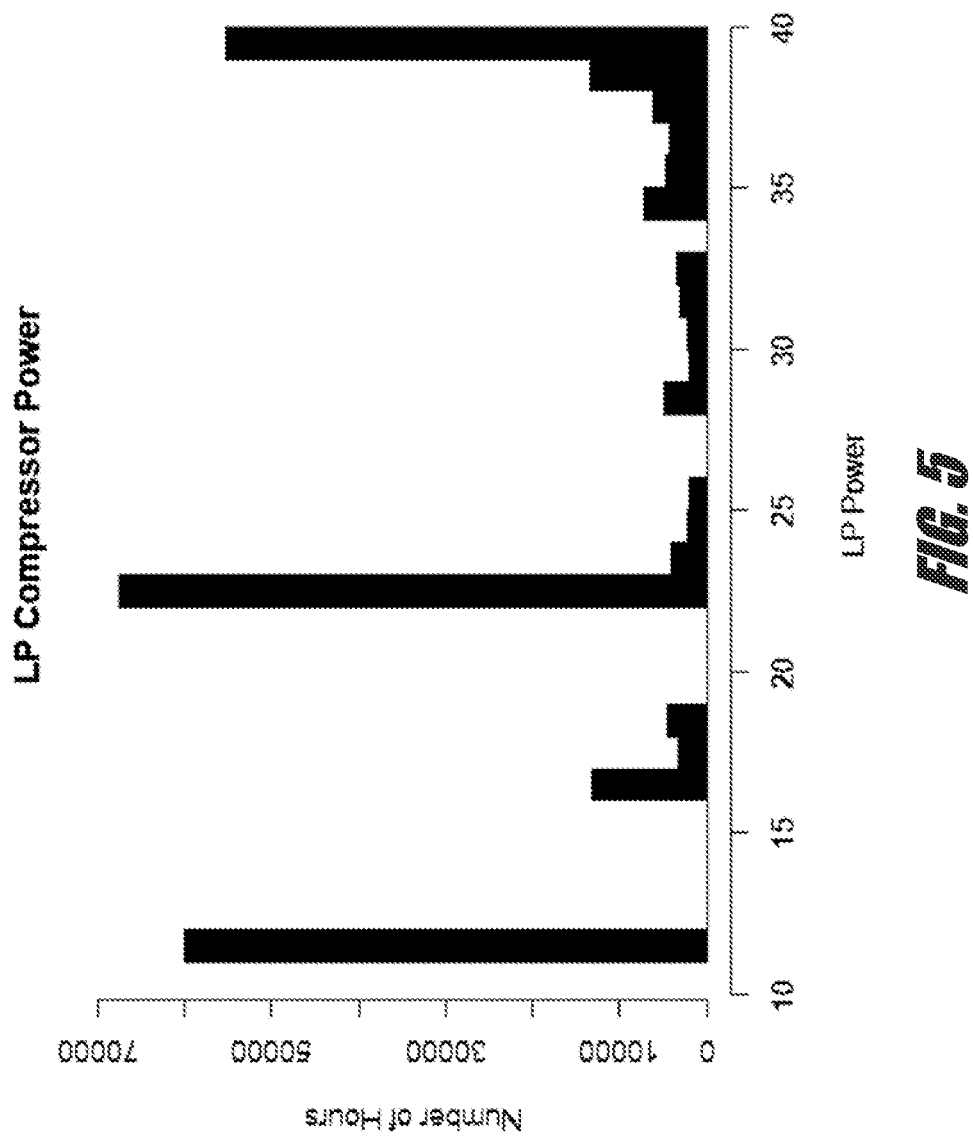
FIG. 5 is a bar chart showing simulated data for the amount of electricity used to power four centrifugal compressors arranged in parallel according to an example of the invention.

FIG. 5 is a bar chart showing simulated data for the amount of electricity used to power four centrifugal compressors arranged in parallel according to an example of the invention over time. In this simulated example, the amount of electricity available for producing gas in the electrolysers dictates the amount of electricity supplied to power the centrifugal compressors. The simulated amount of electricity used to power the electrolysers for producing hydrogen gas for compression in the centrifugal compressors is based on renewable energy source(s). Each centrifugal compressor has a maximum power of 10 MW, bringing the total maximum power for all four compressors to 40 MW. The x-axis shows the amount of power supplied to all four centrifugal compressors (from 10 to 40 MW), and the y-axis shows roughly the amount of time that level of power was being supplied. These results were generated using computer simulation software using real data regarding the power available from wind and solar energy collected over 30 years.

From this figure, it can be seen that about a third of time (60,000 hours; 6.8 years) the centrifugal compressors run a total of about 10 MW of power with all four centrifugal compressors operating in a low power mode. About another third of the time (65,000 hours; 7.4 years) the centrifugal compressors run a total of about 22 MW with potentially 2 compressors in a normal power mode and 2 in low power mode. About a further third of the time (55,000 hours; 6.3 years) the centrifugal compressors run a total of about 40 MW with all four compressors operating in a normal power mode at maximum power. Any peaks less than about 35 MW could potentially result in at least 1 centrifugal compressor operating in the low power mode. At 26 MW of LP CC power, you could potentially have 2 centrifugal compressors operating at maximum power, 1 centrifugal compressor operating in turndown and 1 centrifugal compressors operating in a low power mode.

FIG. 5 thus shows that significant electricity savings can be achieved by switching centrifugal compressors to a low power mode based on the gas flow through the centrifugal compressors, which is dependent on available electricity.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

In this specification, unless expressly otherwise indicated, the word "or" is used in the sense of an operator that returns a true value when either or both of the stated conditions are met, as opposed to the operator "exclusive or" which requires only that one of the conditions is met. The word "comprising" is used in the sense of "including" rather than to mean "consisting of".

All prior teachings above are hereby incorporated herein by reference. No acknowledgement of any prior published document herein should be taken to be an admission or representation that the teaching thereof was common general knowledge in Australia or elsewhere at the date thereof.

The invention claimed is:

1. A process for operating a multistage compression system for compressing gas feed having a variable flow rate, said multistage compression system comprising at least one centrifugal compressor incorporating a dry gas seal with opposed seal faces, said process comprising:
   (a) during periods when the flow rate of the gas through the centrifugal compressor(s) is sufficient for normal operation of said multistage compression system, operating said centrifugal compressor(s) in a normal power mode; and
   (b) during periods when insufficient electricity from one or more renewable sources is available to the multistage compression system such that the flow rate of the gas through the centrifugal compressor(s) is not sufficient for normal operation of said multistage compression system, operating the centrifugal compressor or, if more than one, at least one centrifugal compressor in a low power mode at least sufficient to prevent contact of said opposed seal faces of said dry gas seal in said centrifugal compressor(s), wherein no net compressed gas is produced when the at least one centrifugal compressor operates in the low power mode via a compressed gas output from a product end of the at least one centrifugal compressor being entirely recycled to a feed end of the at least one centrifugal compressor while the at least one centrifugal compressor operates in the low power mode.

2. The process according to claim 1, wherein during operation in said low power mode said at least one centrifugal compressor is operating with a power of about 20% or less relative to maximum power.

3. The process according to claim 1, wherein during operation in said low power mode said at least one centrifugal compressor is operating with a rotor speed in a range from about 100 rpm to about 1500 rpm.

4. The process according to claim 1, wherein during operation in said normal power mode the at least one centrifugal compressor is operating with a power of about 70% or more relative to maximum power and producing at least some net compressed gas.

5. The process according to claim 1, wherein the gas for compression is hydrogen gas.

6. The process according to claim 5, wherein the hydrogen gas is produced by electrolysis of water.

7. The process according to claim 1, wherein the multistage compression system comprises at least one further compressor, and wherein:
   the process comprises compressing gas in said further compressor(s) during the periods when the flow rate of the gas through the centrifugal compressor(s) is not sufficient for the normal operation of said multistage compression system while the operating of the centrifugal compressor or, if more than one, at least one centrifugal compressor in the low power mode at least sufficient to prevent contact of said opposed seal faces of said dry gas seal in said centrifugal compressor(s) is performed.

8. The process according to claim 7, wherein said gas is fed to said further compressor(s) by withdrawing compressed hydrogen gas from storage and, after suitable pressure reduction, feeding said reduced pressure hydrogen gas to said further compressor(s), said further compressor(s) being downstream of said centrifugal compressor(s) in said low power mode.

9. The process according to claim 5, comprising feeding said compressed hydrogen gas to at least one downstream process for consumption in said downstream process(es).

10. The process according to claim 9, wherein at least some of the compressed hydrogen gas is used to produce ammonia and/or methanol in the downstream process(es).

11. The process according to claim 9, wherein said process comprises withdrawing compressed hydrogen gas from storage and, after suitable pressure reduction, feeding said reduced pressure hydrogen gas to said downstream process(es) during the periods when the flow rate of the gas through the centrifugal compressor(s) is not sufficient for the normal operation of said multistage compression system while the operating of the centrifugal compressor or, if more than one, at least one centrifugal compressor in the low power mode at least sufficient to prevent contact of said opposed seal faces of said dry gas seal in said centrifugal compressor(s) is performed.

12. An apparatus for operating a multistage compression system for compressing gas according to claim 1, said apparatus comprising:
a multistage compression system for compressing gas, said multistage compression system comprising a feed end, at least one centrifugal compressor incorporating at least one dry gas seal with opposed seal faces, and an outlet end;
a control system for switching the at least one centrifugal compressor independently between a normal power mode and a low power mode, as required, based on the flow of the gas feed to the multistage compression system, wherein the control system is configured to switch the at least one centrifugal compressor into the low power mode in response to insufficient electricity from one or more renewable sources being available to the multistage compression system such that a flow rate of the gas through the at least one centrifugal compressor is not sufficient for normal operation of said multistage compression system, the low power mode being a mode in which no net compressed gas is produced when the at least one centrifugal compressor operates in the low power mode via the compressed gas outputtable from the outlet end being entirely recycled to the feed end while the at least one centrifugal compressor operates in the low power mode.

13. The apparatus of claim 12, comprising an electricity generation system for generating electricity from at least one renewable energy source, and wherein the gas for compression is produced at least in part using electricity generated from said electricity generation system.

14. The apparatus of claim 12, comprising a plurality of electrolysers for producing hydrogen gas,
wherein the electrolysers are powered at least in part by electricity generated from said electricity generation system, and
wherein said feed end of said multistage compression system is in fluid flow communication with said plurality of electrolysers.

15. The apparatus of claim 12, comprising at least one downstream processing unit for consuming compressed gas, said downstream processing unit(s) being in fluid flow communication with said outlet end of said multistage compression system.

16. The apparatus according to claim 12, comprising:
a storage system for storing compressed gas, said storage system being in fluid flow communication with said outlet end of said multistage compression system and at least one compressor of said multistage compression system; and
a second control system for controlling pressure and flow of compressed gas from said multistage compression system to said storage system and for controlling pressure and flow of compressed gas from said storage system to said compressor(s) of said multistage compression system based on the flow of the gas feed to the multistage compression system.

17. The apparatus of claim 12, wherein the low power mode is defined such that the at least one centrifugal compressor operates with a power of about 20% or less relative to maximum power.

18. The apparatus of claim 12, wherein the low power mode is defined such that the at least one centrifugal compressor operates with a rotor speed in a range from about 100 rpm to about 1500 rpm.

19. The apparatus according to claim 12, wherein the normal power mode is defined such that the at least one centrifugal compressor is operating with a power of about 70% or more relative to maximum power and produces at least some net compressed gas.

* * * * *